United States Patent
Ishibashi et al.

(10) Patent No.: US 8,861,949 B2
(45) Date of Patent: *Oct. 14, 2014

(54) APPARATUS AND METHOD OF ADJUSTING AUTOMATIC FOCUS

(71) Applicant: Samsung Electronics Co., Ltd., Suwon-si (KR)

(72) Inventors: Kenji Ishibashi, Suwon-si (KR); Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/150,281

(22) Filed: Jan. 8, 2014

(65) Prior Publication Data

US 2014/0125862 A1 May 8, 2014

Related U.S. Application Data

(63) Continuation of application No. 13/303,511, filed on Nov. 23, 2011, now Pat. No. 8,660,418.

(30) Foreign Application Priority Data

Jun. 14, 2011 (KR) .................. 10-2011-0057600

(51) Int. Cl.
| | |
|---|---|
| *G03B 3/00* | (2006.01) |
| *G03B 13/00* | (2006.01) |
| *G03B 17/00* | (2006.01) |
| *G03B 9/08* | (2006.01) |
| *H04N 5/238* | (2006.01) |
| *G02B 15/14* | (2006.01) |
| *G02B 7/04* | (2006.01) |
| *G02B 27/40* | (2006.01) |
| *G03B 13/36* | (2006.01) |
| *G02B 7/36* | (2006.01) |
| *H04N 5/232* | (2006.01) |

(52) U.S. Cl.
CPC ............ *H04N 5/23212* (2013.01); *G03B 13/36* (2013.01); *G02B 7/365* (2013.01); *H04N 5/23209* (2013.01)
USPC ............ 396/125; 396/80; 396/452; 396/529; 348/353; 348/363; 359/698; 359/827; 250/201.7

(58) Field of Classification Search
USPC ........... 396/111, 48, 79, 80, 89, 93, 102, 104, 396/125–128, 130, 452, 461, 529–533; 348/345, 353, 363, 373–376; 359/684, 359/693, 698, 705, 819, 822, 823, 825, 359/827–830; 250/201.7
See application file for complete search history.

(56) References Cited

U.S. PATENT DOCUMENTS 5,005,039 A * 4/1991 Hamada et al. ................. 396/95
5,196,881 A * 3/1993 Hamada et al. ............... 396/104
(Continued)

FOREIGN PATENT DOCUMENTS

| EP | 1260844 A1 * | 11/2002 | ............... G02B 7/28 |
| JP | 2001281530 A * | 10/2001 | ............... G02B 7/28 |
| JP | 2004170633 A * | 6/2004 | ............... G02B 7/28 |

(Continued)

OTHER PUBLICATIONS

Search Report established for GB 1208716.9 (Nov. 28, 2012).*

*Primary Examiner* — Rochelle-Ann J Blackman

(74) *Attorney, Agent, or Firm* — Drinker Biddle & Reath LLP

(57) ABSTRACT

An apparatus and method of adjusting an auto focus are provided. The apparatus includes: an imaging pickup device for generating an image signal by capturing light passing through an imaging lens; a shutter for controlling light exposure of the image pickup device; a focus detector that calculates a contrast value from the image signal and detecting a focus from the contrast value; and a release controller for controlling a release operation constituting a photographing operation of a still image, wherein the release controller includes, as driving modes, a first mode that directs a focus lens included in the imaging lens to be driven while driving the shutter, and a second mode that directs the focus lens not to be driven while driving the shutter. Accordingly, a photographing time is reduced.

24 Claims, 23 Drawing Sheets

(56) References Cited

U.S. PATENT DOCUMENTS

| | | | |
|---|---|---|---|
| 5,434,638 A * | 7/1995 | Ishibashi et al. | 396/95 |
| 2003/0063211 A1 * | 4/2003 | Watanabe et al. | 348/345 |
| 2005/0052566 A1 * | 3/2005 | Kato | 348/370 |
| 2006/0181634 A1 * | 8/2006 | Onozawa | 348/345 |
| 2007/0003267 A1 * | 1/2007 | Shibutani | 396/123 |
| 2011/0164868 A1 * | 7/2011 | Hamada | 396/123 |

FOREIGN PATENT DOCUMENTS

| | | | | |
|---|---|---|---|---|
| JP | 2009128610 A | * | 6/2009 | G02B 7/28 |
| JP | 2009128611 A | * | 6/2009 | G02B 7/28 |
| JP | 2010169882 A | * | 8/2010 | G02B 7/28 |

* cited by examiner

FIG. 11

| Focus Speed | |
|---|---|
| FS1 | 2000 |
| FS2 | 2500 |
| FS3 | 3000 |
| FS4 | 3500 |
| FS5 | 4000 |
| FS6 | 4500 |
| FS7 | 5000 |
| FS8 | 5500 |
| FS9 | 6000 |
| FS10 | 6500 |

| Focus Sensitivity | |
|---|---|
| Z1 | 0.16 |
| Z2 | 0.15 |
| Z3 | 0.14 |
| Z4 | 0.13 |
| Z5 | 0.12 |
| Z6 | 0.11 |
| Z7 | 0.10 |
| Z8 | 0.09 |

| Backlash | |
|---|---|
| BL | 30 |

| Actuator | |
|---|---|
| DC | 0 |
| Step | 1 |
| US | 0 |
| VC | 0 |

| Lens Power | |
|---|---|
| Lens Power | 0 |

| Open Iris | |
|---|---|
| Z1 | 2.82 |
| Z2 | 2.9 |
| Z3 | 2.98 |
| Z4 | 3.06 |
| Z5 | 3.16 |
| Z6 | 3.26 |
| Z7 | 3.36 |
| Z8 | 3.5 |

| Focus Length | |
|---|---|
| Z1 | 28.0 |
| Z2 | 33.8 |
| Z3 | 40.9 |
| Z4 | 49.4 |
| Z5 | 59.6 |
| Z6 | 72.0 |
| Z7 | 87.0 |
| Z8 | 105.1 |

| Focus Speed | |
|---|---|
| FS1 | 1000 |
| FS2 | 1250 |
| FS3 | 1500 |
| FS4 | 1750 |
| FS5 | 2000 |
| FS6 | 2250 |
| FS7 | 2500 |
| FS8 | 2750 |
| FS9 | 3000 |
| FS10 | 3250 |

| Focus Sensitivity | |
|---|---|
| Z1 | 0.14 |
| Z2 | 0.13 |
| Z3 | 0.12 |
| Z4 | 0.11 |
| Z5 | 0.10 |
| Z6 | 0.09 |
| Z7 | 0.08 |
| Z8 | 0.07 |

APPARATUS AND METHOD OF ADJUSTING AUTOMATIC FOCUS

CROSS-REFERENCE TO RELATED PATENT APPLICATION

This application is a continuation of U.S. patent application Ser. No. 13/303,511, filed Nov. 23, 2011, which claims the priority benefit of Korean Patent Application No. 10-2011-0057600, filed on Jun. 14, 2011, in the Korean Intellectual Property Office, the disclosure of which is incorporated herein in its entirety by reference.

BACKGROUND

The present invention relates to an apparatus and method of adjusting an auto focus.

In order for a digital photographing apparatus, such as a camera or a camcorder, to capture a clear still image or a clear moving image, it is required to accurately adjust a focus on a subject. Examples of a method of adjusting an auto focus that automatically performs a focus adjustment include a method of adjusting a contrast auto focus and a method of adjusting a phase difference auto focus.

According to the method of adjusting a contrast auto focus, photographing is performed while changing a location of a focus lens while obtaining a contrast value with respect to an image signal generated by an imaging sensor, and the focus lens is driven to a focus lens location where the contrast value is a peak contrast value.

According to the method of adjusting a phase difference auto focus, an individual sensing device aside from an imaging sensor is used, and a focus location is detected from a phase difference of light applied to the individual sensing device.

SUMMARY

The present invention provides an apparatus and method of adjusting an auto focus, where a photographing time is reduced.

According to an embodiment of the present invention, there is provided an apparatus for adjusting an auto focus, the apparatus including: an imaging pickup device that generates an image signal by capturing light passing through an imaging lens; a shutter that controls light exposure of the image pickup device; a focus detector that calculates a contrast value from the image signal and detects a focus from the contrast value; and a release controller that controls a release operation constituting a photographing operation of a still image, wherein the release controller includes, as driving modes, a first mode that directs a focus lens included in the imaging lens to be driven while driving the shutter, and a second mode that directs the focus lens not to be driven while driving the shutter.

The release controller may control the shutter and the focus lens such that a predetermined time interval is included between a point of time when the shutter starts to be driven and a point of time when the focus lens starts to be driven, in the first mode.

The apparatus may further include an exchangeable lens and a body unit, wherein the imaging lens may be included in the exchangeable lens, and the image pickup device, the shutter, the focus detector, and the release controller may be included in the body unit.

The exchangeable lens may further include: a lens storage unit that stores power consumption information; and a communicator that transmits the power consumption information to the body unit, wherein the release controller may select one of the driving modes according to the power consumption information.

The exchangeable lens may further include: a focus lens driver that drives the focus lens; a storage unit that stores driving speed information of the focus lens driver; and a communicator that transmits the driving speed information to the body unit, wherein the release controller may select one of the driving modes according to the driving speed information.

The exchangeable lens may further include: a focus lens driver that drives the focus lens; a storage unit that stores at least one piece of information of focus driving sensitivity information, focus lens driver information, and backlash information of the focus lens; and a communicator that transmits the at least one piece of information to the body unit, wherein the release controller may select one of the driving modes according to the at least one information.

The body unit may further include a display unit that displays a captured image, and may stop a display on the display unit when the release controller operates in the first mode.

The release controller may select one of the driving modes when the focus lens is stopped.

According to another embodiment of the present invention, there is provided an apparatus for adjusting an auto focus, the apparatus including: an image pickup device that generates an image signal by capturing light passing through an imaging lens; a shutter that controls light exposure of the image pickup device; a focus detector that calculates a contrast value from the image signal and detecting a focus from the contrast value; and a release controller that controls a release operation constituting a photographing operation of a still image, wherein the release controller directs a focus lens included in the imaging lens to be driven in a section from a point of time when light exposure for capturing the still image ends to a point of time when the shutter is closed.

The release controller may direct the focus lens to be driven in a direction opposite to a direction of driving the focus lens during the section, after the section is ended.

The driving of the focus lens in the section may be a part of operations for detecting the focus.

The release controller may direct the focus lens to perform remaining operations for detecting the focus by driving the focus lens in the direction opposite to the a direction of driving the focus lens during the section, after the section is ended.

The release controller may control the shutter and the focus lens such that a predetermined time interval is included between a point of time when the shutter starts to be driven and a point of time when the focus lens starts to be driven, when the focus lens is directed to be driven in the section.

The apparatus may further include an exchangeable lens and a body unit, wherein the imaging lens may be included in the exchangeable lens, and the image pickup device, the shutter, the focus detector, and the release controller may be included in the body unit.

The exchangeable lens may further include: a lens storage unit that stores power consumption information; and a communicator that transmits the power consumption information to the body unit, wherein the release controller may determine whether the focus lens is driven in the section according to the power consumption information.

The exchangeable lens may further include: a focus lens driver that drives the focus lens; a storage unit that stores driving speed information of the focus lens driver; and a communicator that transmits the driving speed information to the body unit, wherein the release controller may determine whether the focus lens is driven in the section according to the driving speed information.

The exchangeable lens may further include: a focus lens driver that drives the focus lens; a storage unit that stores at least one piece of information of focus driving sensitivity information, focus lens driver information, and backlash information of the focus lens; and a communicator that transmits the at least one information to the body unit, wherein the release controller may determine whether the focus lens is driven in the section according to the at least one piece of information.

The body unit may further include a display unit that displays a captured image, and stop a display on the display unit when the release controller drives the focus lens in the section.

The body unit may further include a release director that directs a release operation that drives the focus lens and an iris to be performed, and the release controller may direct the focus lens to be driven in the section when the release director directs continuous photographing.

According to another embodiment of the present invention, there is provided a method of adjusting an auto focus of a digital photographing apparatus for capturing a still image according to a shutter signal, the method including: driving a focus lens to adjust a focus; and driving a shutter according to capturing operations of the still image, wherein the focus lens is driven while driving the shutter.

The driving of the shutter may include: driving the shutter before starting light exposure for current photographing; and driving the shutter after the light exposure is ended.

The focus lens may be driven for the current photographing while driving the shutter before starting the light exposure.

The focus lens may be driven for following photographing while driving the shutter after the light exposure is ended.

BRIEF DESCRIPTION OF THE DRAWINGS

The above and other features and advantages of the present invention will become more apparent by describing in detail exemplary embodiments thereof with reference to the attached drawings in which:

FIG. 11 is tables showing lens data according to an embodiment of the present invention;

DETAILED DESCRIPTION

Figure 1:
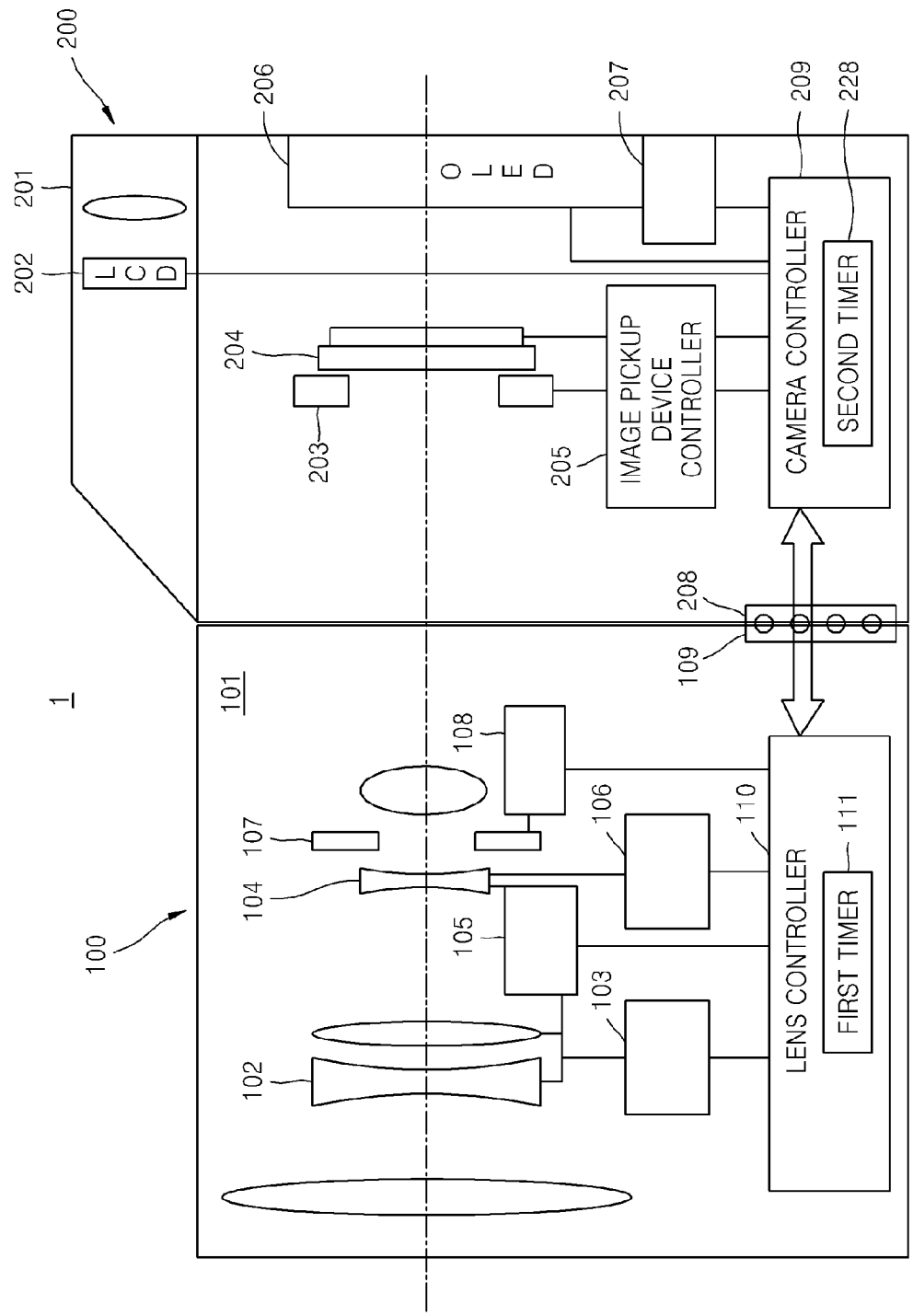
FIG. 1 is a pictorial schematic diagram of a digital photographing apparatus according to an embodiment of the present invention.

Hereinafter, the present invention will be described more fully with reference to the accompanying drawings, in which exemplary embodiments of the invention are shown and described in more detail below. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals denote like elements. Also, in the description below, detailed descriptions about related well-known functions or configurations that may diminish the clarity of the points of the present invention are omitted.

FIG. 1 is a diagram of a digital photographing apparatus 1 according to an embodiment of the present invention.

Referring to FIG. 1, the digital photographing apparatus 1 according to the current embodiment includes an exchangeable lens (hereinafter, referred to as a lens) 100 and a body unit 200. The lens 100 has a focus detecting function and the body unit 200 has a function that drives a focus lens 104 by controlling the lens 100.

The lens 100 includes an image forming optical system 101, a zoom lens location detecting sensor 103, a lens driving actuator 105, a focus lens location detecting sensor 106, an iris driving actuator 108, a lens controller 110, and a lens mount 109.

The image forming optical system 101 includes a zoom lens 102 for adjusting a zoom, the focus lens 104 for changing a focus location, and an iris 107. The zoom lens 102 and the focus lens 104 may each be a lens group in which a plurality of lenses are combined.

The zoom lens location detecting sensor 103 and the focus lens location detecting sensor 106 respectively detect locations of the zoom lens 102 and the focus lens 104. A timing of detecting the location of the focus lens 104 may be set by the lens controller 110 or a camera controller 209 to be described later. For example, the timing of detecting the location of the focus lens 104 may be a timing of performing auto focus (AF) detection using an image signal.

The lens driving actuator 105 and the iris driving actuator 108 are controlled by the lens controller 110, and respectively drive the zoom lens 102 and the focus lens 104, and the iris 107. Specifically, the lens driving actuator 105 drives the focus lens 104 in an optical axis direction.

The lens controller 110 includes a first timer 111 for measuring time. Also, the lens controller 110 transmits information about the detected location of the focus lens 104 to the body unit 200. Here, the lens controller 110 may transmit the information about the detected location of the focus lens 104 to the body unit 200 when the location of the focus lens 104 is changed or when the camera controller 209 requests information about the location of the focus lens 104. Also, the first timer 111 may be reset by a reset signal from the body unit 200, and times of the lens 100 and the body unit 200 may be synchronized according to the reset.

The lens mount 109 includes a lens communication pin, and is used as a transmission path for data, a control signal, or the like by being linked to a camera communication pin.

A structure of the body unit 200 will now be described in detail.

The body unit 200 includes an electronic view finder (EVF) 201, a shutter 203, an image pickup device 204, an image pickup device controller 205, a display unit 206, a manipulation button 207, the camera controller 209, and a camera mount 208.

The EVF 201 may include a liquid crystal display unit 202, and a user may view an image being captured in real time via the EVF 201.

The shutter 203 determines a duration in which light is applied to the image pickup device 204, i.e., an exposure time.

The image pickup device 204 generates an image signal by capturing image light passed through the image forming optical system 101 of the lens 100.

The image pickup device 204 may include a plurality of photoelectric transformation units arranged in a matrix form, and at least one of vertical and horizontal transmission paths for reading the generated image signal by transferring electric charges from the photoelectric transformation units. A charge coupled device (CCD) sensor, a complementary metal oxide semiconductor (CMOS) sensor, or the like may be used as the image pickup device 204.

The image pickup device controller 205 generates a timing signal, and controls the image pickup device 204 to capture an image in synchronization with the timing signal. Also, the image pickup device controller 205 sequentially reads horizontal image signals after accumulation of electric charges is completed in each of scanning lines. The read horizontal image signals are used for the AF detection in the camera controller 209.

The display unit 206 displays various images and information. An organic light emitting display (OLED) or a liquid crystal display (LCD) may be used as the display unit 206.

The user inputs various commands to the manipulation button 207 to manipulate the digital photographing apparatus 1. The manipulation button 207 may include various buttons, such as a shutter release button, a main switch, a mode dial, and a menu button.

The camera controller 209 calculates a contrast value by performing the AF detection on the image signal generated by the image pickup device 204. Also, the camera controller 209 stores a contrast value at each of AF detecting points of time according to the timing signal generated by the image pickup device controller 205, and calculates the focus location by using the information about the focus lens 104 received from the lens 100 and the stored contrast value. The calculated focus location is transmitted to the lens 100. The camera controller 209 may include a second timer 228 for measuring time, and the second timer 228 may be simultaneously reset with the first timer 111 so that the lens 100 and the body unit 200 measure the same time.

The camera mount 208 includes a camera communication pin. Also, power may be supplied to the lens controller 110 through the camera mount 208.

Schematic operations of the lens 100 and the body unit 200 will now be described.

When a subject is to be photographed, an operation of the digital photographing apparatus 1 starts by manipulating the main switch included in the manipulation button 207. The digital photographing apparatus 1 first displays a live view as follows.

Image light of the subject passes through the image forming optical system 101 and is incident on the image pickup device 204. At this time, the shutter 203 is in an open state. The incident image light is converted into an electric signal by the image pickup device 204, and thus an image signal is generated. The image pickup device 204 operates according to a timing signal generated by the image pickup device controller 205. The generated image signal is converted into data displayable by the camera controller 209, and is output to the EVF 201 and the display unit 206. Such an operation is called a live view display, and a live view image displayed according to the live view display is a moving image that is continuously displayed.

After the live view display, the digital photographing apparatus 1 starts an AF operation when the shutter release button, which is one of the manipulation button 207, is half-pressed. The AF operation is performed by using the image signal generated by the image pickup device 204. According to a contrast AF method, a focus location is calculated from a contrast value, and the lens 100 is driven based on the calculated focus location. The contrast value is calculated by the camera controller 209. The camera controller 209 calculates information for controlling the focus lens 104 from the contrast value, and transmits the calculated information to the lens controller 110 through the lens communication pin and the camera communication pin respectively included in the lens mount 109 and the camera mount 208.

The lens controller 110 performs the AF operation by driving the focus lens 104 in the optical axis direction by controlling the lens driving actuator 105 based on the received information. The location of the focus lens 104 is monitored by the focus lens location detecting sensor 106 and fed back to the camera controller 209.

When the zoom lens 102 is manipulated by the user to perform a zoom operation, the zoom lens location detecting sensor 103 detects the location of the zoom lens 102, and the lens controller 110 changes AF control parameters of the focus lens 104 to perform the AF operation again.

When a focus on the subject is adjusted through the above operations, the shutter release button is completely pressed and thus the digital photographing apparatus 1 performs light exposure. Here, the camera controller 209 first completely closes the shutter 203, and then transmits light measurement information obtained thus far to the lens controller 110 as iris control information. The lens controller 110 controls the iris driving actuator 108 based on the iris control information, and adjusts the iris 107 to have a suitable iris value. The camera controller 209 controls the shutter 203 based on the light measurement information, and captures an image of the subject by opening the shutter 203 for a suitable exposure time.

An image signal process and a compression process are performed on the captured subject image, and the processed subject image is stored in a memory card 212. At the same time, a captured image is output to the EVF 201 and the display unit 206, where the subject is displayed. Such a captured image is referred to as a quick view image.

Thus, the series of photographing operations are completed as described above.

Figure 2:
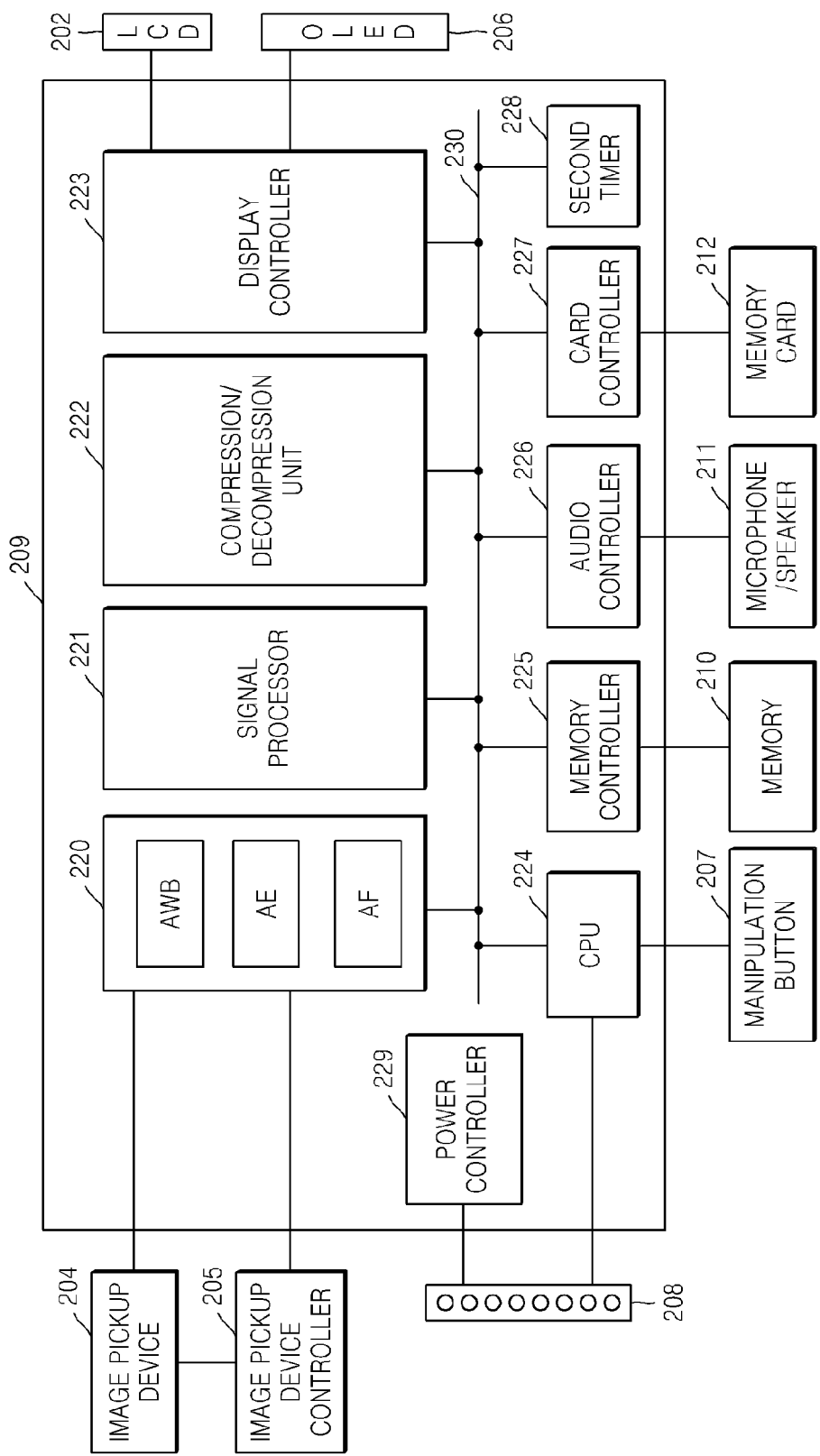
FIG. 2 is a block diagram of a camera controller of the digital photographing apparatus of FIG. 1.

FIG. 2 is a diagram of the camera controller 209 of the digital photographing apparatus 1 of FIG. 1, according to an embodiment of the present invention.

Referring to FIG. 2, the camera controller 209 according to the current embodiment may include a pre-processor 220, a signal processor 221, a compression/decompression unit 222, a display controller 223, a central processing unit (CPU) 224, a memory controller 225, an audio controller 226, a card controller 227, the second timer 228, a power controller 229, and a main bus 230.

The camera controller 209 transmits various directions and data to corresponding elements through the main bus 230.

The pre-processor 220 performs an auto white balance (AWB) operation, an auto exposure (AE) operation, and an AF operation by receiving an image signal generated by the image pickup device 204. In other words, a contrast value for adjusting a focus, an AE evaluation value for adjusting exposure, and an AWB evaluation value for adjusting white balance are calculated.

The signal processor 221 performs a series of image signal processes, such as gamma correction, on the image signal generated by the image pickup device 204 to prepare a live view image or a captured image displayable on the display unit 206.

The compression/decompression unit 222 performs compression and extension on the image signal on which the image signal processes have been performed. According to the compression, for example, an image signal is compressed in a compression format, such as a JPEG compression format or an H.264 compression format. An image file including image data generated via the compression is transmitted to and stored in the memory card 212.

The display controller 223 controls image output to a display screen, such as the liquid crystal display unit 202 of the EVF 201 or the display unit 206.

The CPU 224 controls overall operations of each element. Also, according to the digital photographing apparatus 1 of FIG. 1, the CPU 224 communicates with the lens 100.

The memory controller 225 controls a memory 210 for temporarily storing data, such as the captured image or image related information, and the audio controller 226 controls a microphone or speaker 211. Also, the card controller 227 controls the memory card 212 that stores the captured image.

The second timer 228 measures time by being simultaneously reset with the first timer 111.

The power controller 229 controls power supply to the digital photographing apparatus 1 and to the lens controller 110.

FIGS. 3A through 3D are graphs for describing an AF operation in a contrast AF method. In the contrast AF method, the AF operation is performed by detecting a location of a focus lens, where a contrast value of a subject is maximum, as a focus location. In FIGS. 3A through 3D, a horizontal axis denotes a location of a focus lens, and a vertical axis denotes a contrast value.

Figure 3A:
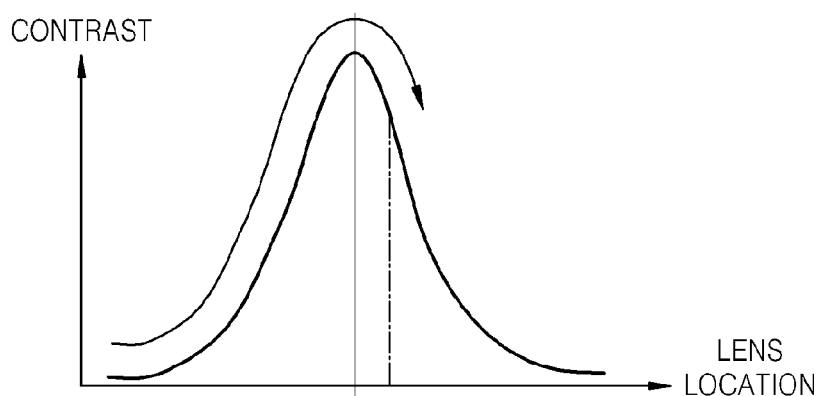
FIGS. 3A through 3D are graphs for describing an auto focus (AF) operation in a contrast AF method.

In FIG. 3A, a peak of a contrast value is detected by driving a focus lens in one direction at a high speed from a state where a contrast value is low as a subject is out of focus.

Figure 3B:
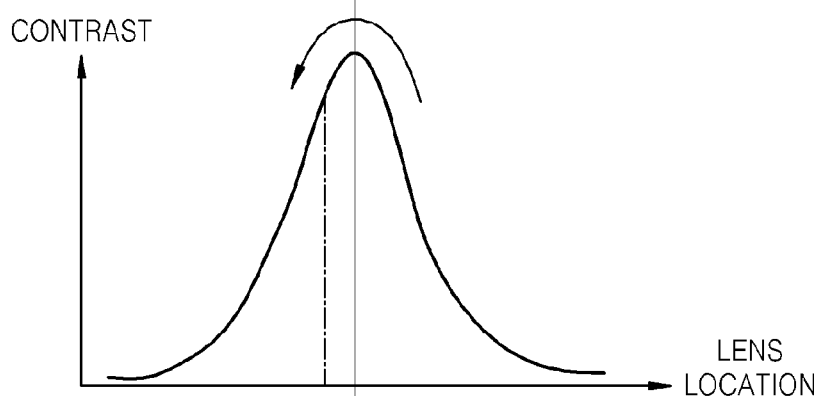

In FIG. 3B, the lens driving direction is reversed, and the peak is detected again by driving the focus lens at a low speed compared to the high speed of FIG. 3A. Accordingly, the AF operation may be performed precisely.

Figure 3C:
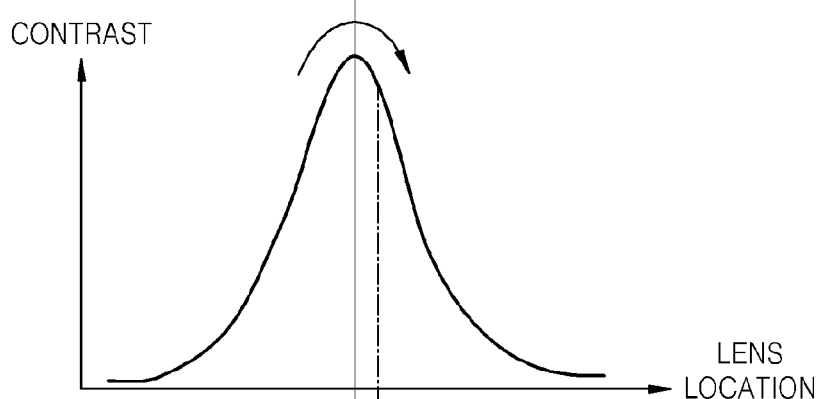

In FIG. 3C, the focus lens is driven toward a focus location according to the detected peak. However, a device that drives a lens generally has backlash, and an error may be generated in a lens location according to a driven direction. Accordingly, the focus lens is driven to pass through the focus location in FIG. 3C in order to allow for removal of the error.

Figure 3D:
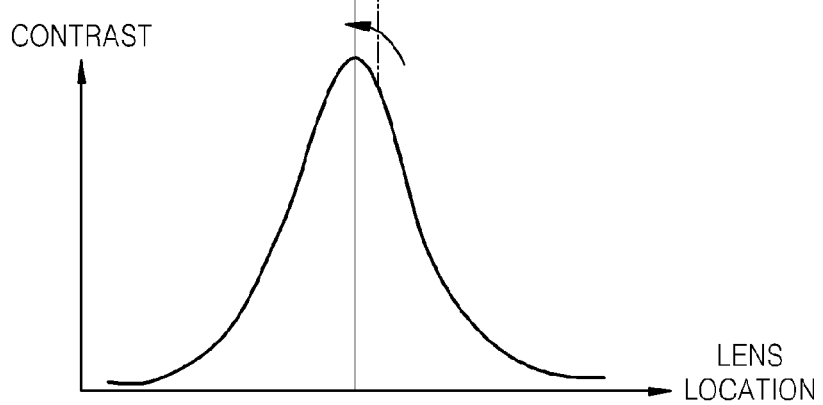

In FIG. 3D, the lens driving direction is again reversed and thus the focus lens is driven in the same direction as in FIG. 3B where the focus location is finally determined, and the focus lens is stopped at the focus location.

Thus, the AF operation is performed as described above.

An operation of photographing a subject according to the AF operation will now be described in detail.

Figure 4:
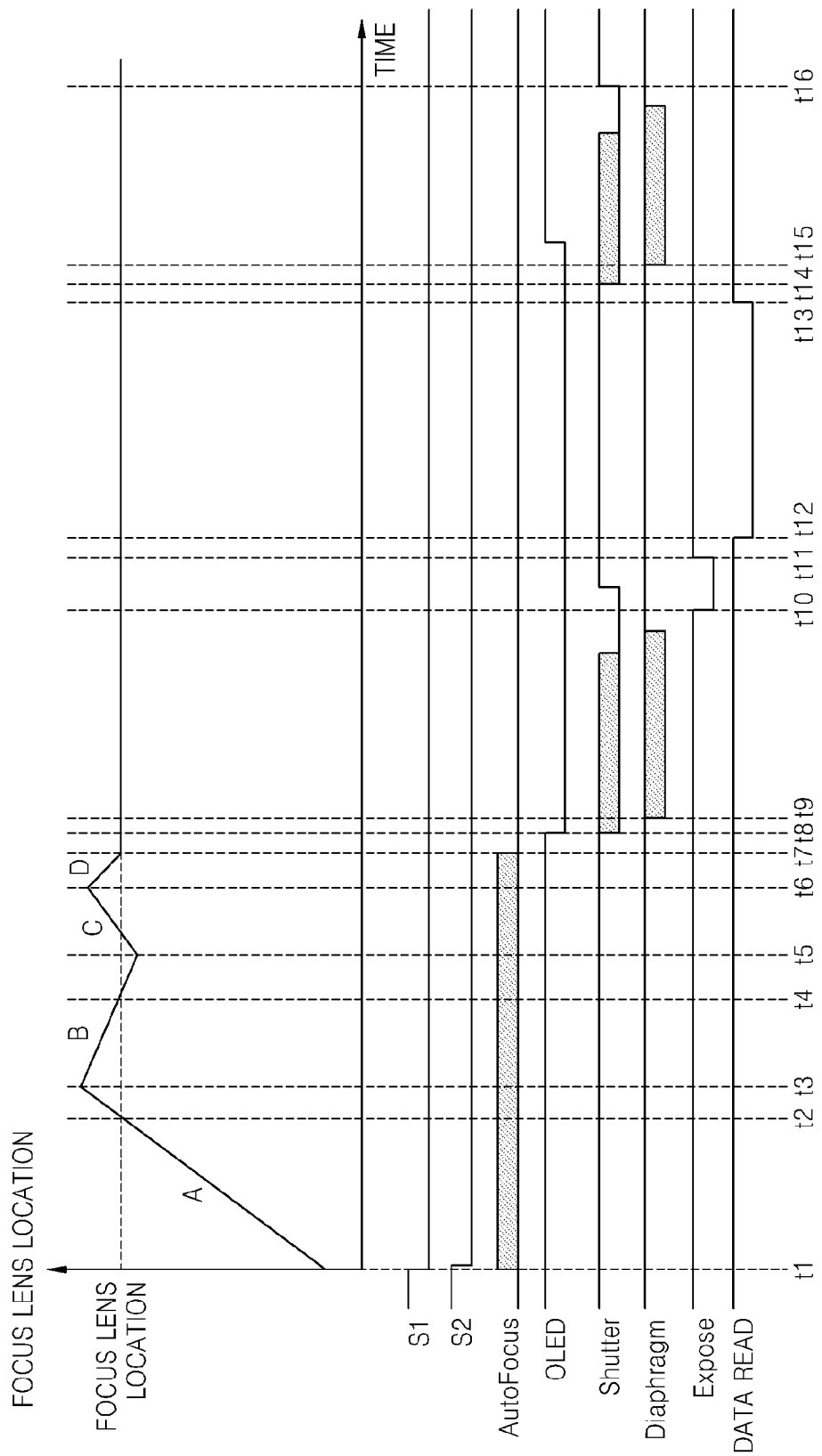
FIG. 4 is a timing diagram showing a general AF method.

FIG. 4 is a timing diagram showing a general AF method. In other words, FIG. 4 is a timing diagram showing a focus lens not being driven, i.e. the AF operation is not performed during a release operation.

In FIG. 4, a horizontal axis denotes time, and a vertical axis denotes a location of a focus lens. S1 and S2 respectively denote a photographing operation start signal and a release start signal received from a user. Auto Focus denotes a driven state of the focus lens, and the focus lens is driven in a gray portion. OLED denotes a state of the display unit 206. When the OLED is in a high level, an image of a subject is displayed on the display unit 206, and when the OLED is in a low level, a black screen is displayed on the display unit 206. Shutter denotes a driven state of a shutter driving actuator (not shown) for opening or shutting the shutter 203, and the shutter 203 is driven in gray portions. Also, a low level denotes a break state (pause state) and a high level denotes an off state. Diaphragm denotes a driven state of the iris 107, and the iris 107 is driven in gray portions. Expose denotes a timing when the subject image is exposed on the image pickup device 204, which begins when the shutter 203 is actually opened. Data Read denotes a timing when an image signal of the image pickup device 204 is recorded in a storage medium, while the Data Read is in a low level.

Referring to FIG. 4, the AF operation starts according to manipulation of S1 by the user at a time t1. First, as described with reference to FIGS. 3A through 3D, an operation A for detecting a peak of a contrast value at a high speed is performed. Since a peak location needs to be passed to detect the peak of the contrast value at a time t2, a driven direction of a lens is reversed at a time t3 when the peak location is passed by a predetermined distance. Then an operation B for precisely detecting the peak location is performed. Similarly, the peak location is detected at a time t4, and the driven direction of the lens is reversed at a time t5 when the peak location is passed by a predetermined distance. At the time t5, a focus location is determined to be the peak location detected at the time t4. An operation C is performed toward the focus location, and an operation D is performed by reversing the driven direction of the lens again to compensate for backlash at the time t6.

When a level of S2 is low at a time t7 when the operation D is completed (when the user requests release), a release operation starts. First, the shutter 203 is driven at a time t8 from an opened state to a closed state by a shutter actuator (not shown). A direct current (DC) motor may be used to drive the shutter 203, and a high current flows when the DC motor starts to drive the shutter 203. Accordingly, at a time t9 after a predetermined time has passed after starting the driving of the shutter 203, for example, after 15 ms, the iris 107 starts to be driven. The iris 107 is driven by transmitting a command from the body unit 200 to the lens 100 through the communication pin of the lens mount 109. The shutter 203 is driven for a predetermined time, for example, 40 ms, and then enters into a break state (pause state). An iris value of the iris 107 changes according to luminance of the subject. However, the iris 107 is driven for a predetermined time, for example, within 70 ms.

After the driving of the shutter 203 and iris 107 is completed, a light exposure operation starts at a time t10. The shutter 203 is closed after a time set according to a set shutter speed, and thus the light exposure operation is completed at a time t11.

When the light exposure operation is completed, data is read from the image pickup device 204 at a time t12. When the data is completely read at a time t13 after a predetermined time, for example, after 110 ms, the shutter 203 starts to be driven at a time t14 to open the shutter 203 for following photographing. Here, as described above, the iris 107 is driven to be opened at a time t15 after a predetermined time has passed, due to a driving current of the shutter actuator.

Embodiments of the present invention will now be described.

Figure 5:
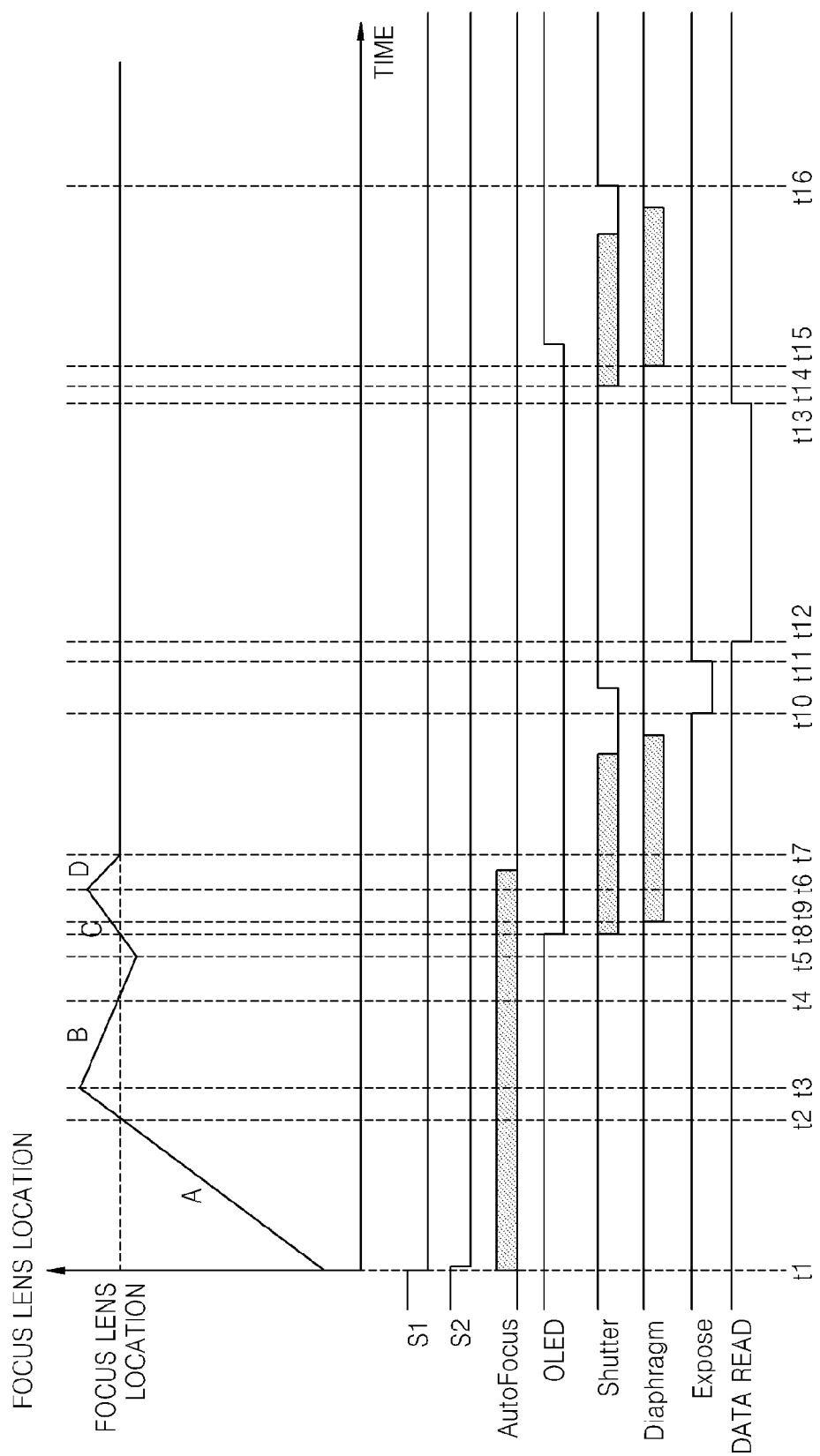
FIG. 5 is a timing diagram showing an AF method according to an embodiment of the present invention.

FIG. 5 is a timing diagram showing an AF method according to an embodiment of the present invention. FIG. 5 is a timing diagram showing driving of the focus lens 104, i.e., when the AF operation is performed.

Referring to FIG. 5, operations at times t1 through t5 are identical to those of FIG. 4.

Since a focus location is determined at the time t5, driving amounts in operations C and D may also be determined. Times required to perform the operations C and D are calculated according to the driving amounts and driving speeds, and if the operations C and D are operable up to a time t10 when light exposure starts, a release operation starts at the same time as with the operations C and D constituting the AF operation from the time t5. Here, since operations at times t6 through t16 are identical to those of FIG. 4, details thereof will be omitted herein.

As shown in FIG. 5, the focus lens 104 is driven during the release operation in the current embodiment. When compared with FIG. 4, an interval from the time t5 when the operation B ends to the time t10 when the light exposure starts is clearly reduced in FIG. 5.

Figure 6:
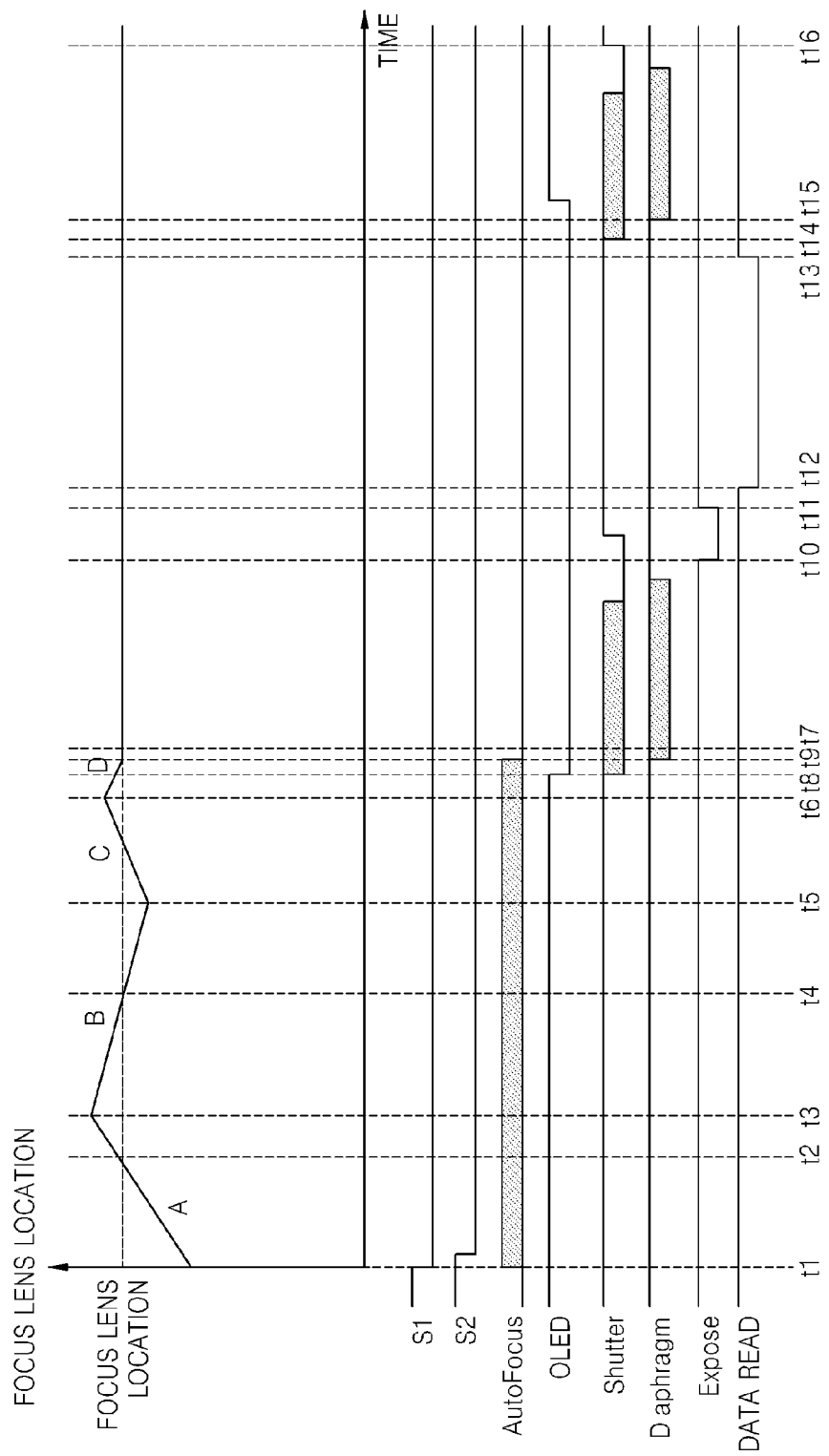
FIG. 6 is a timing diagram showing an AF method according to another embodiment of the present invention.

FIG. 6 is a timing diagram showing an AF method according to another embodiment of the present invention. FIG. 6 is a timing diagram when the focus lens 104 is driven, i.e., when the AF operation is performed, wherein a driving speed of the focus lens 104 is slow. In a camera system using an exchangeable lens, a driving speed of a focus lens may differ according to a type of the exchangeable lens.

Referring to FIG. 6, when a driving speed of the focus lens 104 is slow, a point of time when operations C and D are completed may be behind a time t10 when light exposure starts, when times required to perform the operations C and D are calculated at a time t5. In this case, the operation C is performed first, and the time required to perform the operation D is calculated again at a time t6. Here, while calculating the time required to perform the operation D, a driving time of a backlash amount required to reverse a driven direction of the focus lens 104 is included. If the operation D is completed before the time t10, the release operation starts while starting the operation D. In other words, the release operation closing the shutter 203 starts at the time t8.

As shown in FIG. 6, according to the current embodiment, the focus lens 104 is driven while performing the release operation. Compared with FIG. 4, an interval from the time t6 when the operation C ends to the time t10 when the light exposure starts is clearly reduced in FIG. 6.

However, in FIGS. 5 and 6, the time t10 when the light exposure starts may be behind the time t7 when the AF operation ends.

Operations of the body unit 200 according to FIGS. 5 and 6 will now be described in detail.

Figures 12, 13:
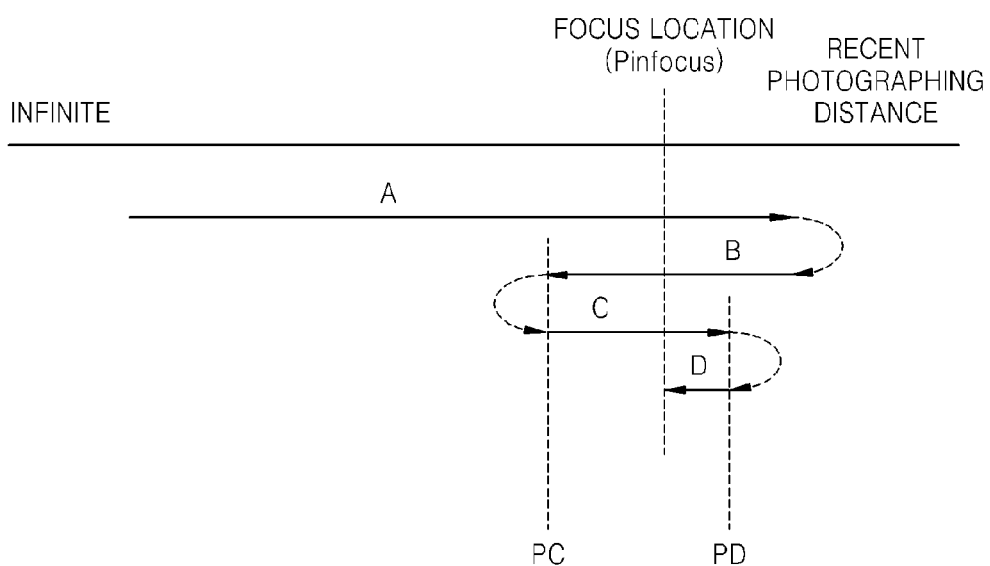
FIG. 12 is tables showing lens data according to another embodiment of the present invention.
FIG. 13 is a map diagram showing a focus lens moving according to an AF operation.

FIGS. 7 through 10 are flowcharts illustrating a method of controlling the body unit 200 of the digital photographing apparatus 1, according to an embodiment of the present invention. FIGS. 11 and 12 are tables showing lens data according to embodiments of the present invention. FIG. 13 is a diagram showing the focus lens 104 moving according to the AF operation.

Figure 7:
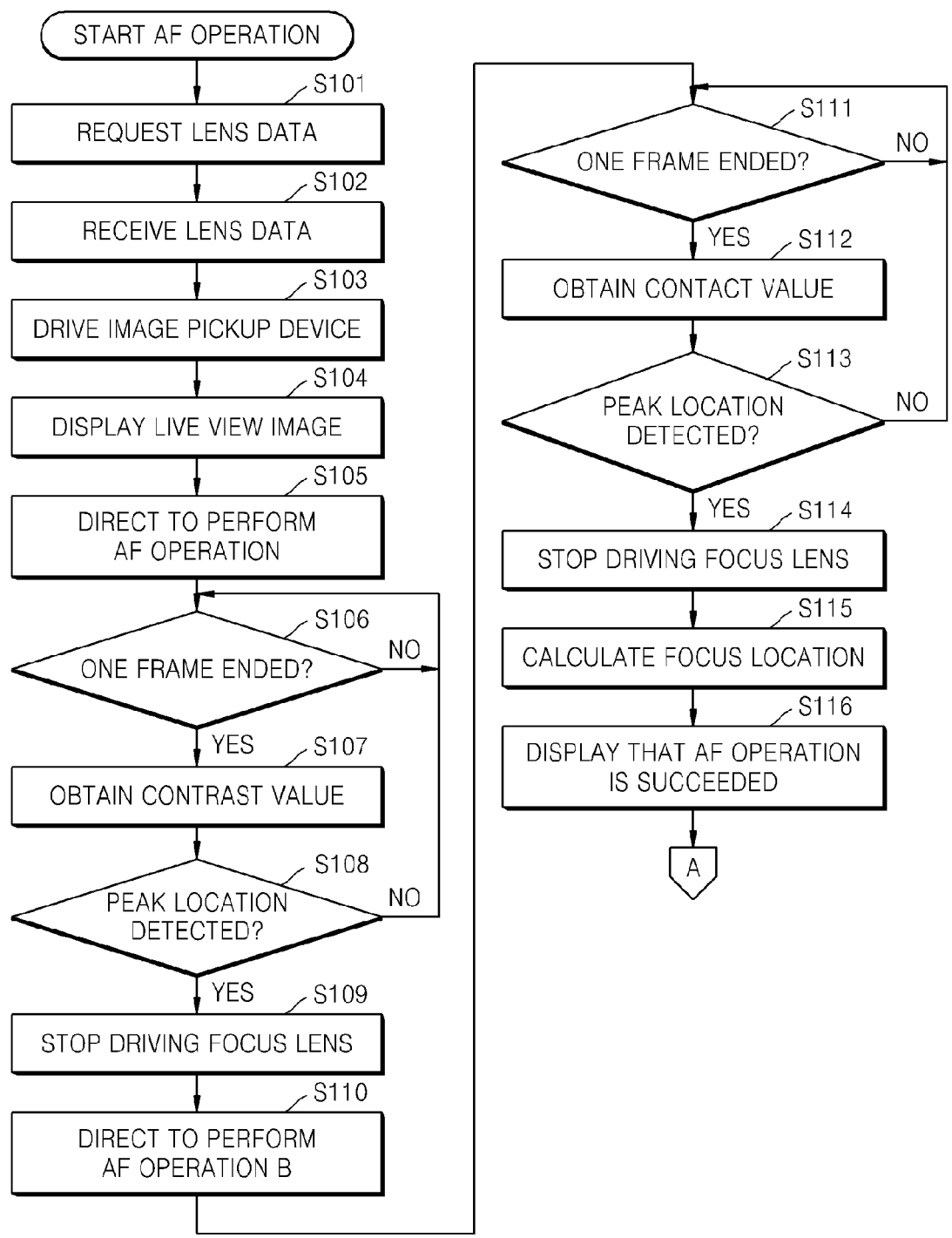
FIGS. 7 through 10 are flowcharts illustrating a method of controlling a body unit of a digital photographing apparatus, according to an embodiment of the present invention.

Referring to FIG. 7, the body unit 200 first requests the lens 100 to transmit lens data in operation S101, and receives the lens data by communicating with the lens 100 in operation S102. The lens data will now be described in detail with reference to FIGS. 11 and 12.

Referring to FIG. 11, "Focus Speed" denotes data indicating a driving speed of an AF of the lens 100. For example, the driving speed may be in 10 stages from a lowest speed FS1 to a highest speed FS10. The driving speed may be indicated in a number of steps drivable in 1 second. Here, one step denotes a minimum unit of location control while performing the AF of the lens 100. In FIG. 11, the lens 100 is drivable at 2000 pulses per second (pps) at the lowest speed FS1 and at 6500 pps at the highest speed FS10. When directing the lens 100 to drive the focus lens 104, the body unit 200 may select an optimum driving speed based on "Focus Speed", and the lens 100 may drive the focus lens 104 at the selected driving speed.

"Focus Sensitivity" is a coefficient for converting a defocus constituting a lens defocus amount to a number of driving steps, and denotes sensitivity of a focus driving amount with respect to a lens driving amount. "Focus Sensitivity" includes data corresponding to focal lengths of the zoom lens 102. For example, at a focal length Z1, "Focus Sensitivity" is 0.32 pulse/micron, which means that the zoom lens 102 is driven by 0.32 pulse to drive defocus of 1 micron.

"Backlash" denotes a backlash amount generated when a driven direction of the focus lens 104 is reversed, and is shown in units of pulses. According to the current embodiment, for example, 30 pulses of backlash are generated.

"Actuator" denotes data indicating a type of driving actuator for AF. "Actuator" stores data about selecting one of a DC motor, a step motor, an ultrasonic wave motor, and a voice coil motor. A step motor is used in the current embodiment.

"Lens Power" denotes data indicating whether power consumption of an actuator of the lens 100 is equal to or above a base value. For example, the base value may be 2 A. When "Lens Power" is 0, the power consumption may be below or equal to the base value, and when "Lens Power" is 1, the power consumption may be above the base value.

"Open Iris" denotes data of an open F number (FNo) according to the focal lengths. Since the open F number changes according to a zooming operation of the zoom lens 102, "Open Iris" may include the open F number for each of the focal lengths.

"Focus Length" indicates focal length information at each focal length. According to the current embodiment, for example, the lens 100 may be 28 mm at a wide-end and 105.1 mm at a telephoto-end, wherein a focal length range is divided into 8.

The lens data described above is only an example, and may differ according to a type of the lens 100.

FIG. 12 shows a portion of another lens data of which is different from that of the lens 100 of FIG. 11. Here, the driving speed is slower and the focus sensitivity is higher compared to the lens 100 of FIG. 11.

Referring back to FIG. 7, after the body unit 200 obtains the lens data, the body unit 200 drives the image pickup device 204 in operation S103, and displays a live view image on the display unit 206 in operation S104.

Then, the lens 100 is directed to be driven to perform the AF operation of FIGS. 3A through 3D in operation S105. In operation S105, the operation A performed at a high speed is performed. For example, in the operation A, a driving amount of the lens 100 is set to be F number×300μ during an AF obtaining period. Accordingly, when the lens 100 is located at a wide-end and the F number is 2.8, the lens 100 is moved by 2.8×300μ=840μ in 16.7 ms (60 f/s), which is one detecting period. This means that the lens 100 is driven by about 50400μ in 1 second. When the driving amount is converted into a driving speed, for example, when the driving amount is multiplied by 0.16 of "Focus Sensitivity" of FIG. 11, the lens 100 is driven at a speed of 8064 pps. However, since the lens 100 cannot be driven at 8064 pps in FIG. 11, the lens 100 is driven at a maximum speed of 6500 pps.

When the operation A starts to be performed, a contrast value of a subject for the AF is obtained at every one frame, that is, a period in which image information is updated, in operations S106 and S107. Then, it is determined whether a peak location of the contrast value is detected in operation S108. For example, contrast values detected in frames may be compared, and it may be determined that the peak location is detected if the contrast values decreases for 2 consecutive frames compared to the contrast value detected in a certain previous frame. In other words, if C(n−1), C(n), C(n+1), and C(n+2) respectively denote contrast values obtained in frames n−1, n, n+1, and n+2, C(n) may be determined to be a peak when C(n)>C(n−1), C(n)>C(n+1), and C(n+1)>C(n+2). When it is determined that the peak location is detected, the focus lens 104 stops being driven in operation S109.

Then, the operation B is performed in operation S110 to precisely detect a focus location. In the operation B, the driving amount of the lens 100 is set to be F number×150μ during the AF obtaining period. Accordingly, when the lens 100 is located at a wide-end and the F number is 2.8, the lens 100 is moved by 2.8×150μ=420μ in 16.7 ms (60 f/s), which is one detecting period. This means that the lens 100 is driven by about 25200μ in 1 second. When the driving amount is converted into a driving speed, for example, when the driving amount is multiplied by 0.16 of "Focus Sensitivity" of FIG. 11, the lens 100 is driven at a speed of 4032 pps. However, since there is no speed corresponding to 4032 pps in FIG. 11, the lens 100 is driven at a maximum speed of 4000 pps closet to 4032 pps.

When the operation B starts to be performed, the contrast value of the subject for the AF is obtained at every one frame, that is, the period in which image information is updated, in operations S111 and S112. Then, it is determined whether the peak location of the contrast value is detected in operation S113. When it is determined that the peak location is detected, the focus lens 104 stops being driven in operation S114.

Also, in order to more precisely detect the focus location, the focus location is accurately calculated in operation S115 by performing interpolation calculation using the contrast values of C(n−1), C(n), and C(n+1) and the location of the focus lens 104 from the frames where the contrast values are detected. Then, a message that the AF operation has succeeded is displayed in operation S116.

The method will now be described with reference to FIGS. 8A and 8B.

Figure 8A:
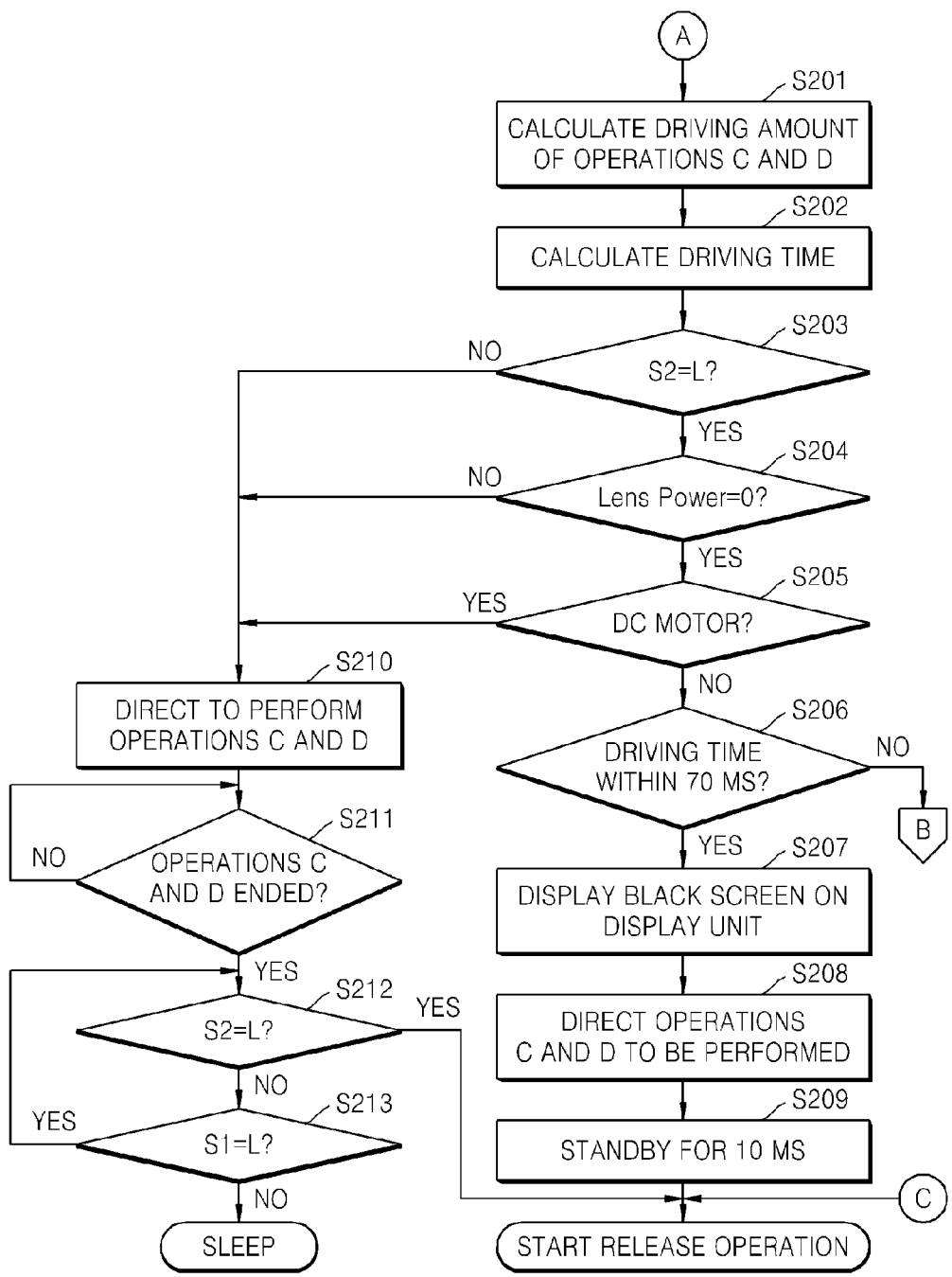
Figure 8B:
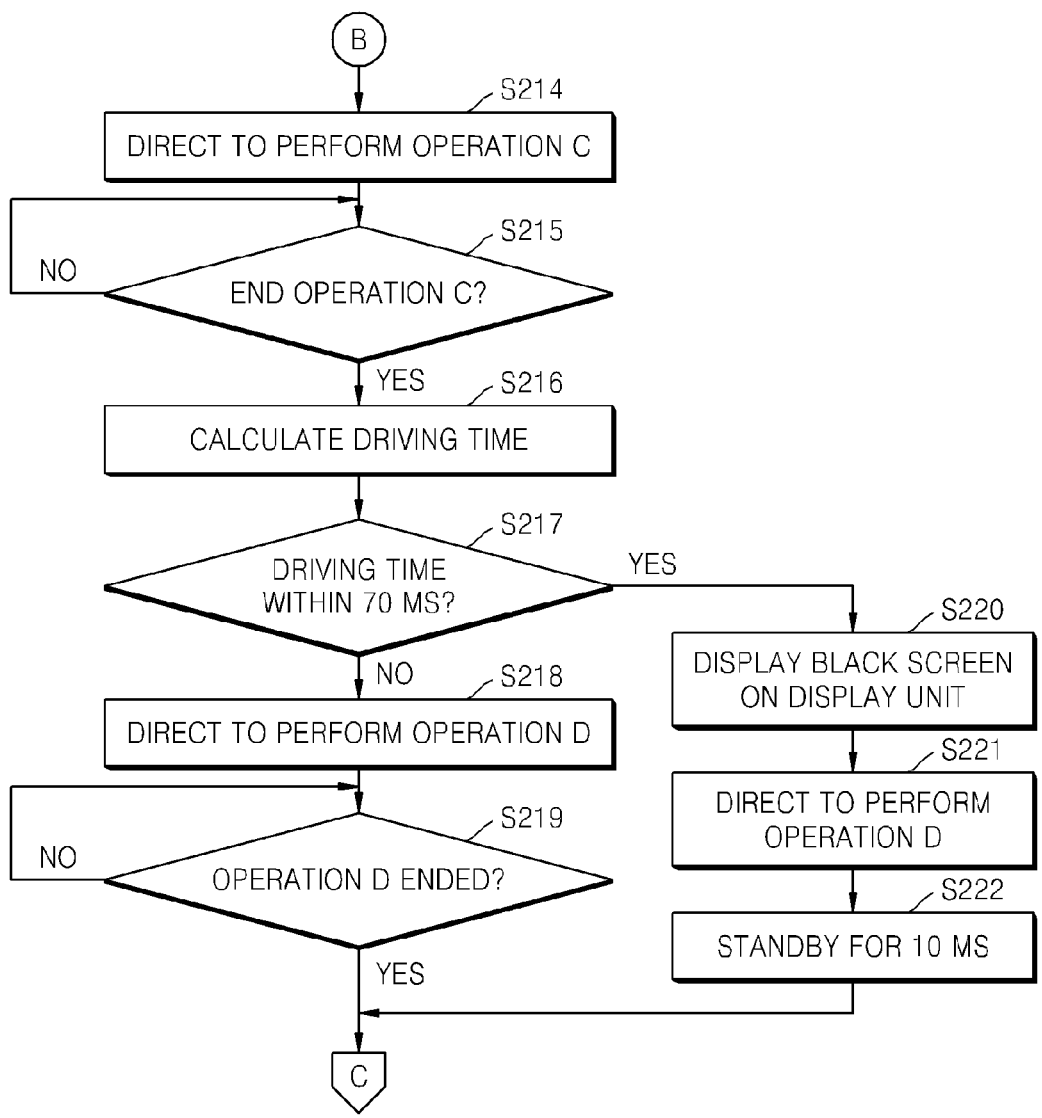

Referring to FIGS. 8A and 8B, a driving amount of the operations C and D that drives the focus lens 104 to the calculated focus location during the AF operation are calculated in operation S201. The driving amount is calculated based on a current location of the focus lens 104, the focus location, and a backlash amount. The driving amount may be obtained by adding a driving amount of the operation C, a driving amount of the operation D, and a driving amount according to a double backlash amount due to two driven direction reversals during the operations C and D. The calculating of the driving amount will now be described in detail with reference to FIG. 13.

FIG. 13 is a diagram showing the focus lens 104 moving according to the AF operation. In FIG. 13, a horizontal axis denotes the location of the focus lens 104. The focus lens 104 may be driven from infinite photographing distance to a close photographing distance.

Operation S201 is performed at a point of time when the operations A and B described above are completed, and the focus lens 104 is located at a location PC. The operations C and D are performed from the location PC, and a driving amount from the location PC to a focus location Pinfocus is calculated. The driving amount of the operation C is determined by adding a difference between the location PC and the focus location Pinfocus and a number of steps required to perform a reverse operation. In other words, as shown in FIG. 13, the total driving amount of the operations C and D is obtained by adding the driving amount of the operation C, the driving amount of the operation D, and the driving amount according to backlash indicated by a dotted line.

For example, when the driving amount of the operation C is 280 steps and the driving amount of the operation D is 80 steps, the driving amount of the operations C and D is 360 steps. When the driving amount according to the backlash, here, 30 steps, is added twice, a driving amount of 420 steps is obtained, and the 420 steps is the total driving amount of the operations C and D.

Also, a driving time is calculated by applying a maximum speed of "Focus Speed" to the total driving amount in operation S202. Since the maximum speed is 6500 pps, the driving time according to the current embodiment is 65 ms. The driving time is only an example, and may vary according to "Focus Speed", "Focus Sensitivity", and "Backlash" of a lens.

Referring back to FIG. 8A, it is determined whether S2 requesting to perform a release operation is in a low level (L) in operation S203.

When S2 is in a high level (H), that is, there is no request to perform the release operation, the operations C and D are performed in operation S210. Then, it is determined whether the operations C and D are ended in operation S211, and if the operations C and D are ended, it is again determined whether S2 is in the low level or the high level in operation S212. If S2 is determined to be in the low level, the release operation starts to be performed, and if S2 is determined to be in the high level, operation S213 for determining whether S1 is in a low level is performed.

When S1 is in the low level, operation S212 is performed, and when S1 is in a high level, the body unit 200 enters into a sleep mode.

Meanwhile, if S2 is determined to be in the low level in operation S203, i.e., when the release operation is requested, it is determined if "Lens Power" data is 0 in operation S204. When the "Lens Power" data is 1 and thus the power consumption of the lens 100 exceeds 2 A, it is difficult to simultaneously drive the shutter 203, the iris 107, and the focus lens 104. Accordingly, operation S209 is performed to end the driving of the focus lens 104 before the release operation. Alternatively, when the "Lens Power" data is 0, it is determined whether the lens driving actuator 105 is a DC motor in operation S205. If it is determined that the lens driving actuator 105 is a DC motor, operation S109 is performed to end the driving of the focus lens 104 before the release operation since the DC motor has a high driving current. If the lens driving actuator 105 is not a DC motor, it is determined whether the driving time calculated in operation S202 is within a predetermined value in operation S206. Here, the predetermined value may be a value enabling the time t7 of FIG. 7 when the operations C and D are ended to be the time t10 when the light exposure starts. Alternatively, the predetermined value may be a time required to process the release operation, wherein the driving of the shutter 203 and the iris 107 are performed during this time. For example, the predetermined value may be 70 ms.

When a driving time of the operations C and D is determined to be within 70 ms in operation S206, displaying of the live view image is stopped to reduce power consumption, and a black screen is displayed on the display unit 206 in operation S207. Then, the operations C and D are directed to be performed on the lens 100 in operation S208. Then, the body unit 200 stands by for a predetermined time, for example, after about 10 ms, after directing the operations C and D to be performed, in operation S209.

When it is determined that the driving time is equal to or above 70 ms in operation S206, the AF operation does not end during the release operation. Accordingly, the operation C is performed and then ended in operations S214 and S215. Then, a driving time of the operation D is calculated again in operation S216. Here, the driving time is calculated by adding the backlash amount to the driving amount of the operation D. For example, when the driving amount of the operation D is 80 steps and the driving amount of the backlash is 30 steps, the total driving amount of the operation D is 110 steps. When the operation D is performed at the driving speed of 6500 pps, the driving time is 17 ms.

After calculating the driving time of the operation D, it is determined whether the driving time is within a predetermined value in operation S217. When the driving time of the operation D is within the predetermined value, for example, within 70 ms, the displaying of the live view image is stopped, and a black screen is displayed on the display unit 206 in operation S220. Then, the lens 110 is directed to perform the operation D in operation S221, and the release operation is performed after standing by for a predetermined time in operation S222.

Alternatively, when the driving time is determined to be equal to or above the predetermined value in operation S217, the operation D is performed in operation S218, and the end of the operation D is determined in operation S219. Then, the release operation is performed after the operation D is ended.

Next, the method will be described with reference to FIG. 9.

Figure 9:
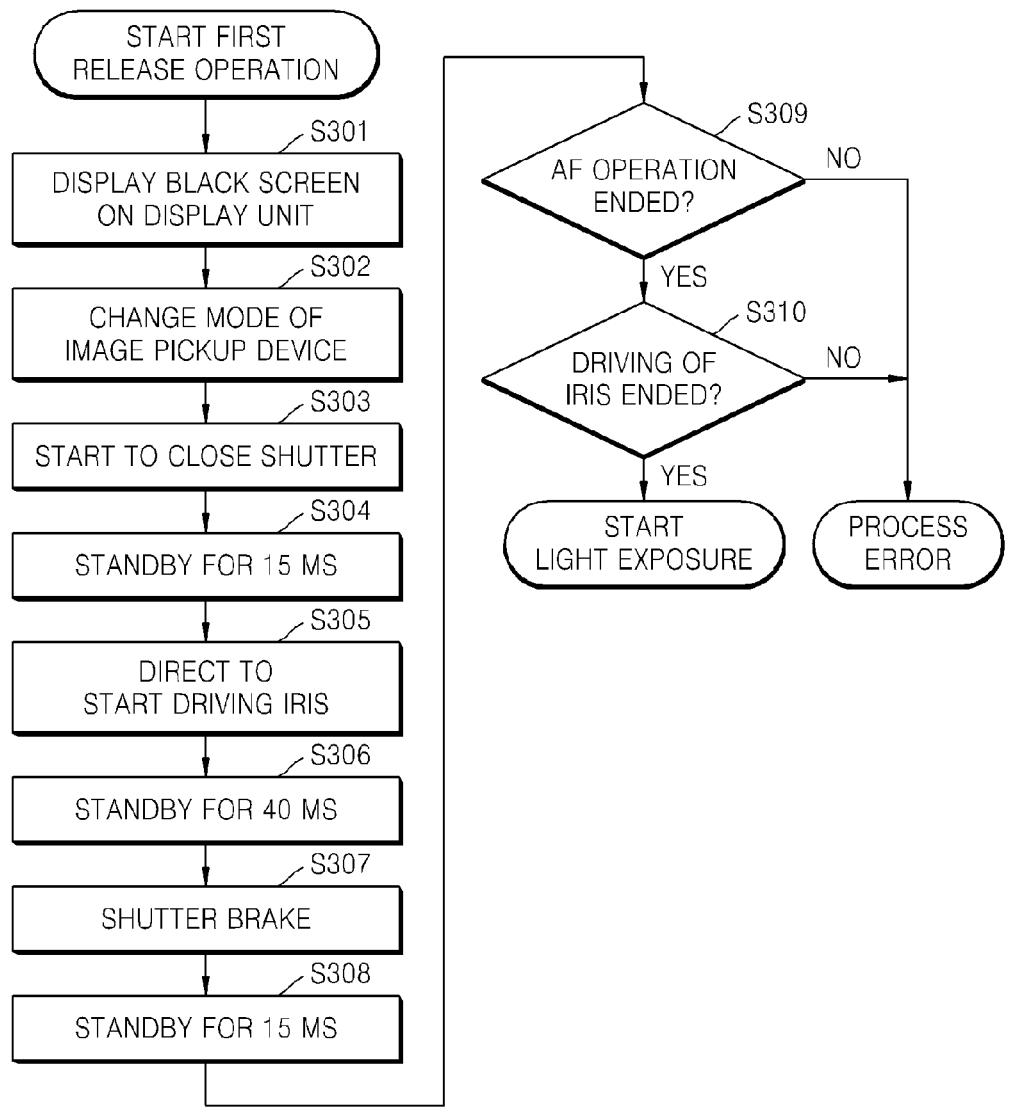

Referring to FIG. 9, when the release operation starts, a black screen is displayed on the display unit 206, and it is displayed to the user that the release operation is being performed, in operation S301. When an OLED is used as the display unit 206, power consumption is almost proportional to display luminance since the OLED is a self-emission display device. Accordingly, by displaying a black screen, required power is reduced, thereby increasing power supplied to an actuator or the like during the release operation.

The image pickup device 204 is entered into a still image capture mode in operation S302, and the shutter 203 is changed from an open state to display a live view image to a closed state in operation S303. Since a DC motor is used as an actuator that drives the shutter 203, a high driving current is required to start driving the shutter 203. Accordingly, the body unit 200 stands by for a predetermined time, for example, about 15 ms, in operation S304 after the shutter 203 starts to be driven, and directs the lens 100 to drive the iris 107 in operation S305.

The body unit 200 stands by for a predetermined time, for example, about 40 ms, to end the driving of the shutter 203 in operation S306, and then a shutter brake is put on the shutter 203 in operation S307. Then, the body unit 200 stands by for a predetermined time, for example, about 15 ms, to end the driving of the iris 107 in operation S308, and then it is determined whether the AF operation and the driving of the iris 107 are ended respectively in operation S309 and S310.

When the AF operation or the driving of the iris 107 is not ended, it is determined that a mechanical error has been generated, and thus an error process is performed. When the AF operation and the driving of the iris 107 are normally ended, light exposure starts to be performed.

Next, the method will now be described with respect to FIG. 10.

Figure 10:
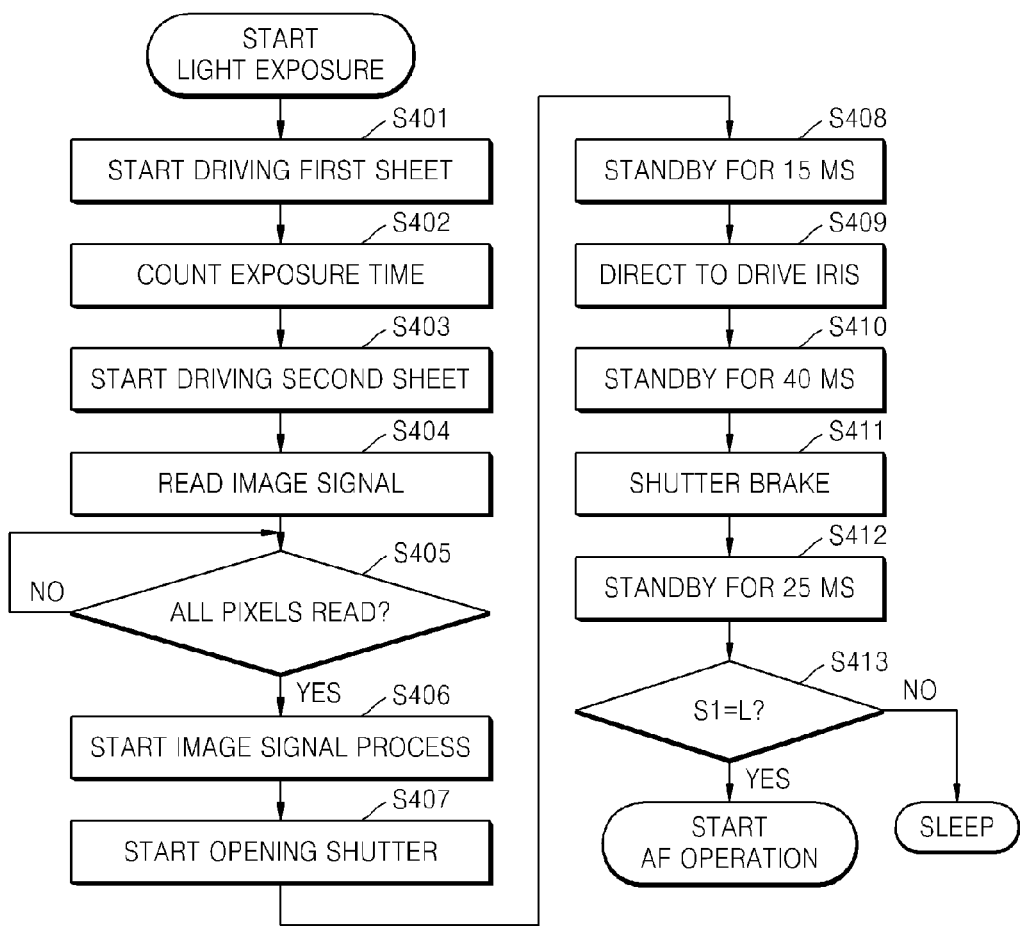

Referring to FIG. 10, when the light exposure starts to be performed, a first sheet or a front sheet of the shutter 203 is driven in operation S401. Accordingly, an exposure time is counted in operation S402. When a predetermined exposure time has passed, a second sheet or a rear sheet is driven in operation S403.

After the first and second sheets are driven, an image signal is read in operation S404 by a CMOS image sensor constituting the image pickup device 204. When it is determined that operation S404 has been performed on all pixels in operation S405, an image signal process for accumulating an image as an image file is performed in operation S406.

Then, since all pixels are read, the shutter 203 is opened in operation S407 for following photographing, and then the body unit 200 stands by for a predetermined time, for example, about 15 ms, in operation S408.

The lens 100 is directed to start opening the iris 107 after the standby in operation S409, and the body unit 200 stands by for a predetermined time, for example, about 40 ms, in operation S410.

After 40 ms, the driving of the shutter 203 is stopped and thus a shutter brake is put on the shutter 203 in operation S411, and the body unit 200 stands by for a predetermined time, for example, about 25 ms, in operation S412. Then, it is determined whether S1 is in the low level in operation S413. If S1 is in the low level, the AF operation is again performed, and if S1 is in the high level, the body unit 200 is entered into the sleep mode since the digital photographing apparatus 1 is not being manipulated.

As such, the AF operation and the release operation are performed by the body unit 200.

Operations of the lens 100 will now be described in detail.

Figure 14:
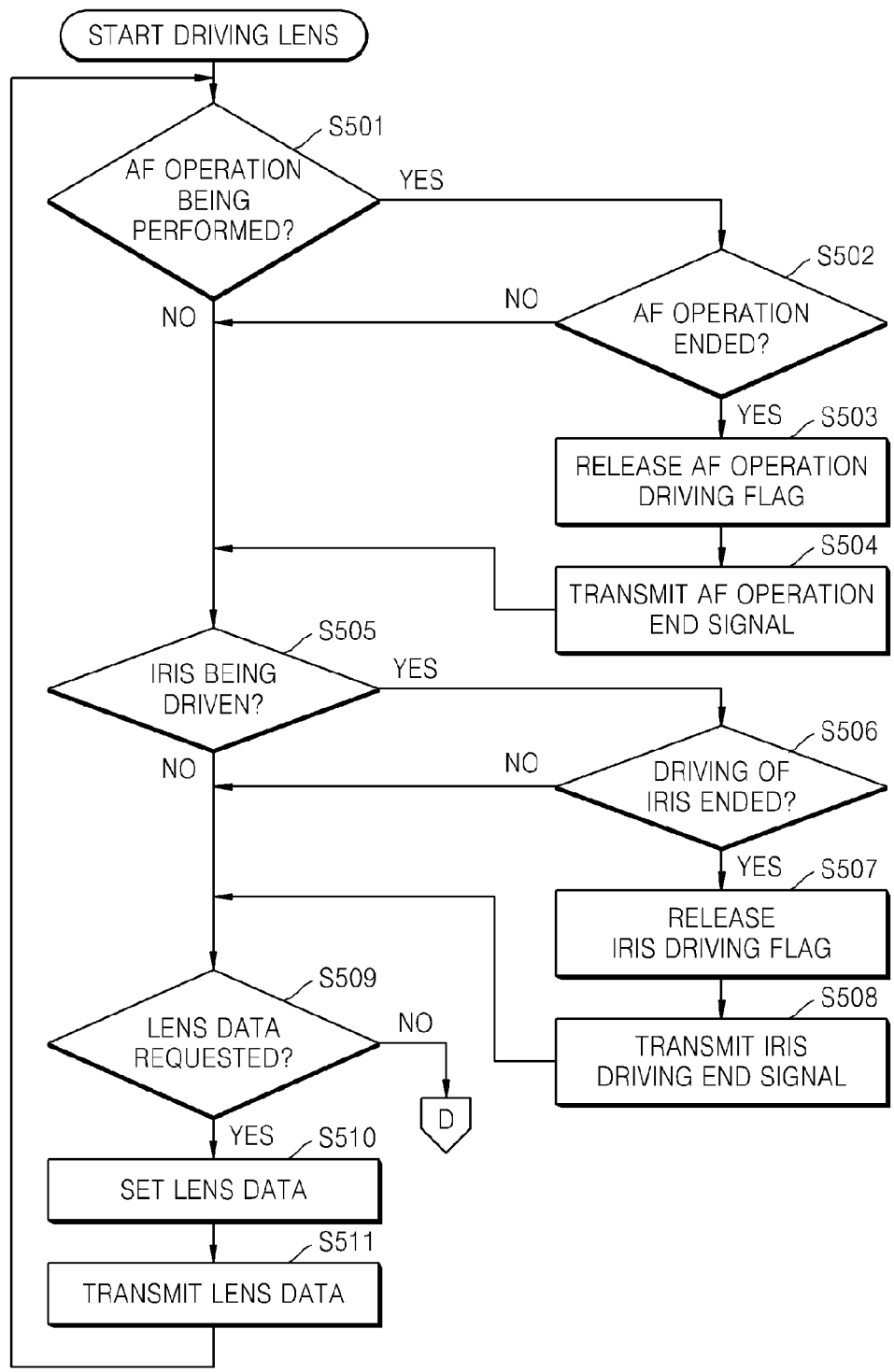
FIGS. 14 through 16 are flowcharts illustrating a method of controlling a lens of a digital photographing apparatus, according to an embodiment of the present invention.
Figure 15:
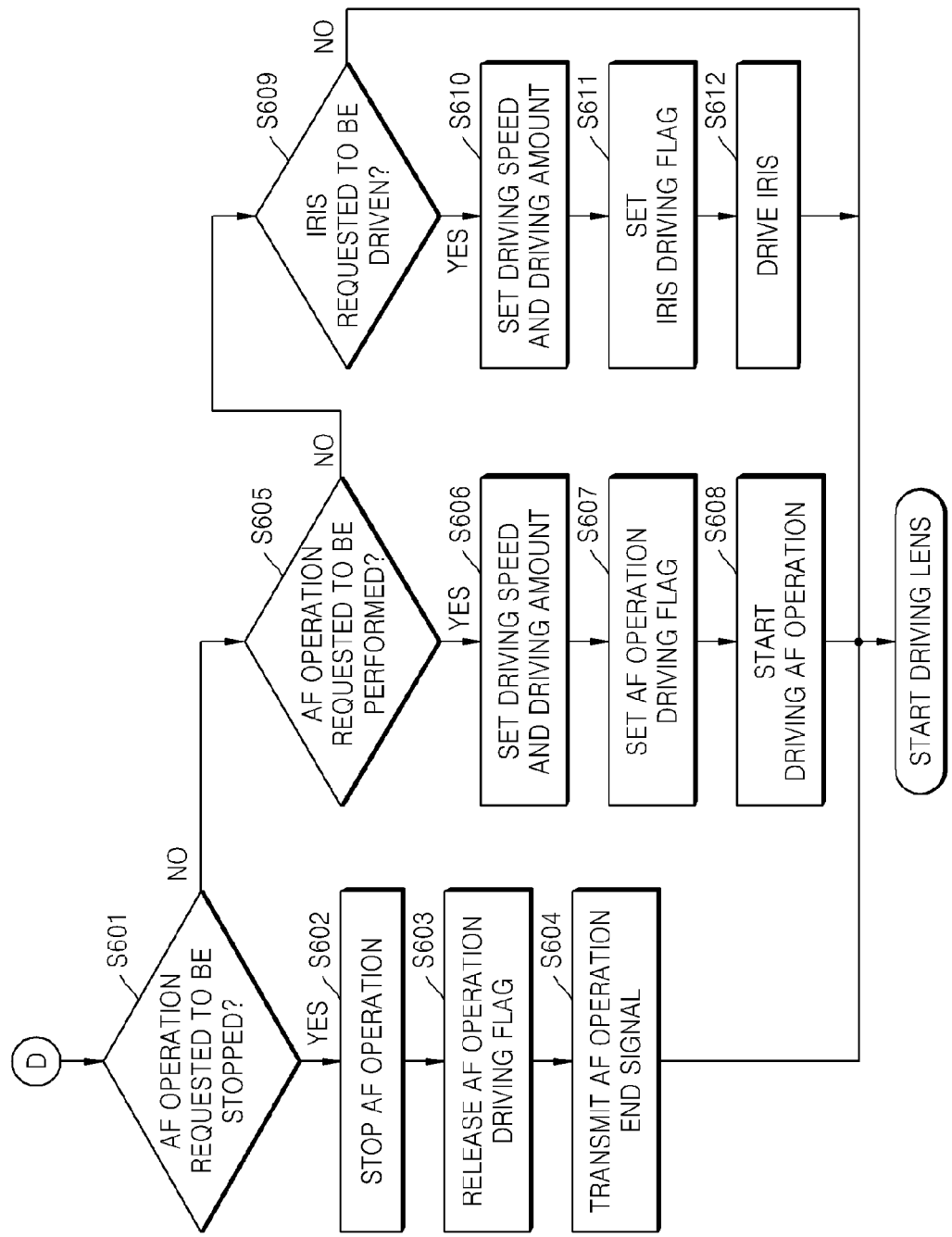
Figure 16:
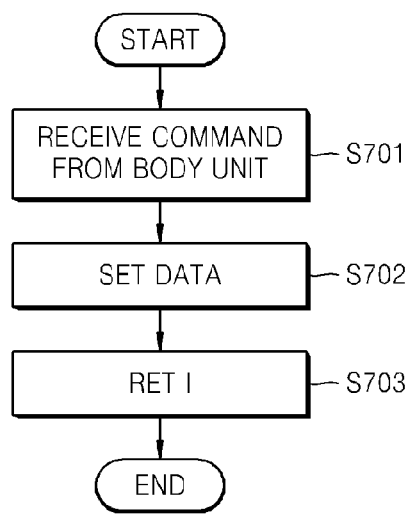

FIGS. 14 through 16 are flowcharts illustrating a method of controlling the lens 100 of the digital photographing apparatus 1, according to an embodiment of the present invention.

Referring to FIG. 14, when the lens 100 starts to be driven, it is determined whether the AF operation is being performed in operation S501. When the AF operation is being performed, it is determined whether the AF operation is ended in operation S502. When the AF operation is ended, an AF operation driving flag is released in operation S503, and an AF operation end signal is transmitted to the body unit 200 in operation S504.

When the AF operation is not being performed or the AF operation is ended, it is determined whether the iris 107 is being driven in operation S505. If the iris 107 is being driven, it is determined whether the driving of the iris 107 is ended in operation S506. If the driving of the iris 107 is ended, an iris driving flag is released in operation S507, and an iris driving end signal is transmitted to the body unit 200 in operation S508.

If the iris 107 is not being driven or the driving of the iris 107 is ended, it is determined whether the body unit 200 requested to transmit lens data in operation S509. If the lens data is requested, the lens data is set in operation S510, the set lens data is transmitted to the body unit 200 in operation S511, and then operations S501 through S510 are performed again.

Referring to FIG. 15, if the body unit 200 did not request to transmit the lens data, it is determined whether the AF operation is requested to be stopped in operation S601. If the AF operation is requested to be stopped, the driving of the focus lens 104 is immediately stopped in operation S602, and a focus lens driving flag is released in operation S603. Then, an AF operation end signal is transmitted to the body unit 200 in operation S604.

Meanwhile, if the AF operation is not requested to be stopped, it is determined whether the AF operation is requested to be performed in operation S605. If the AF operation is requested to be performed, a driving speed and a driving amount of the AF operation are set in operation S606 according to a direction of the body unit 200, and an AF operation driving flag is set in operation S607. Then, the AF operation starts to be driven in operation S608.

Alternatively, if the AF operation is not requested to be performed in operation S605, it is determined whether the iris 107 is requested to be driven in operation S609. If the iris 107 is requested to be driven, a driving speed and a driving amount of the iris 107 are set in operation S610 according to the direction of the body unit 200, and an iris driving flag is set in operation S611. Then, the iris 107 is driven in operation S612. If the iris 107 is not requested to be driven in operation S609, the lens 100 starts to be driven to control a following loop.

FIG. 16 shows a case when data is received from the body unit 200. An interrupt process is performed on the data from the body unit 200 according to an update request from the body unit 200.

Upon receiving a command from the body unit 200 in operation S701, the data is set according to the received command via the interrupt process in operation S702. After the data is set, the lens 100 returns from an interrupt process loop (returns from an interrupt routine (RETI)), in operation S703.

As such, the lens 100 performs the AF operation and the release operation according to the current embodiment of the present invention.

According to the digital photographing apparatus 1, the AF operation is performed while performing the release operation, thereby reducing a photographing time, as described above.

Figure 17:
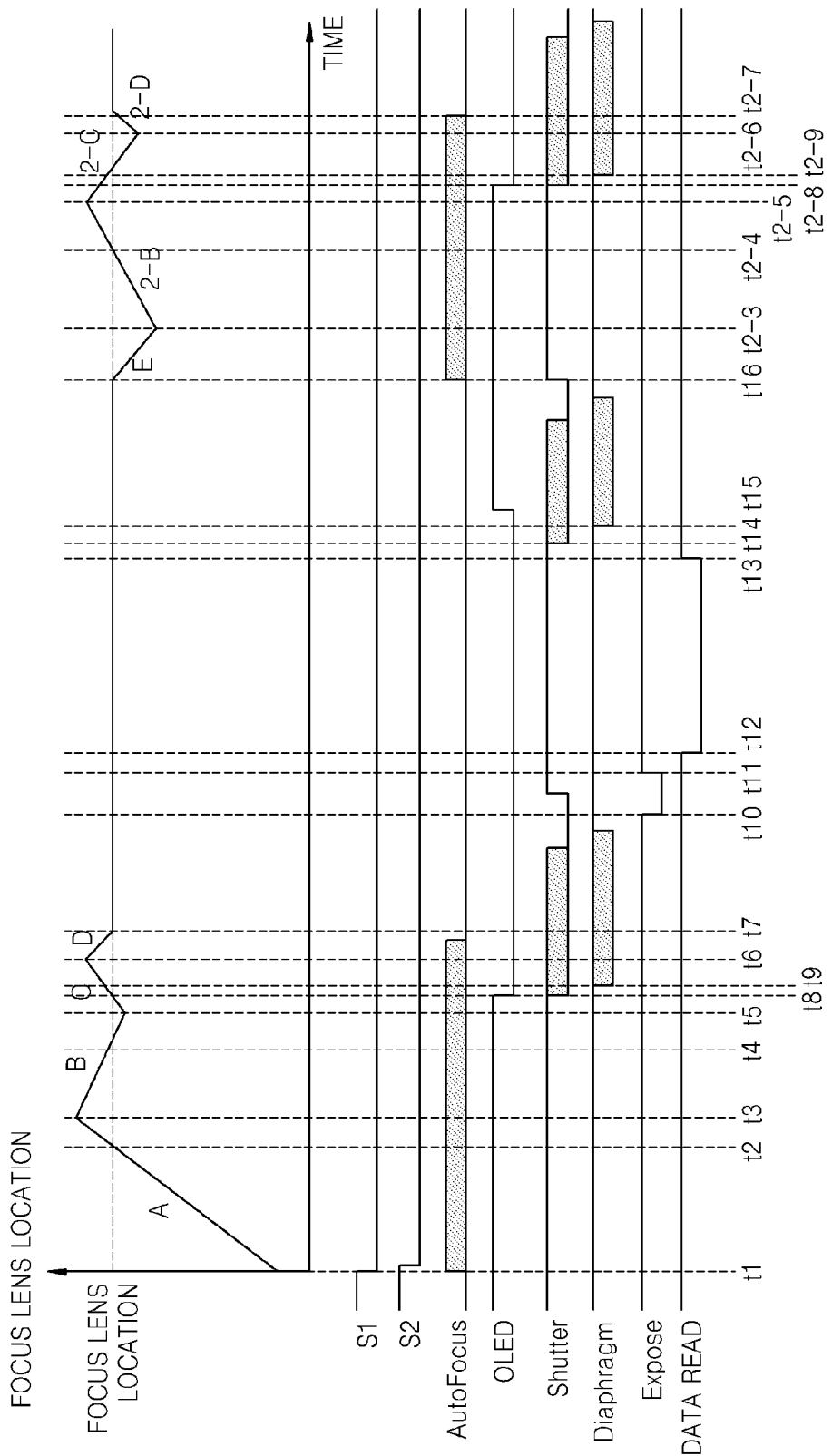
FIG. 17 is a timing diagram for describing an AF method according to another embodiment of the present invention.
Figure 18:
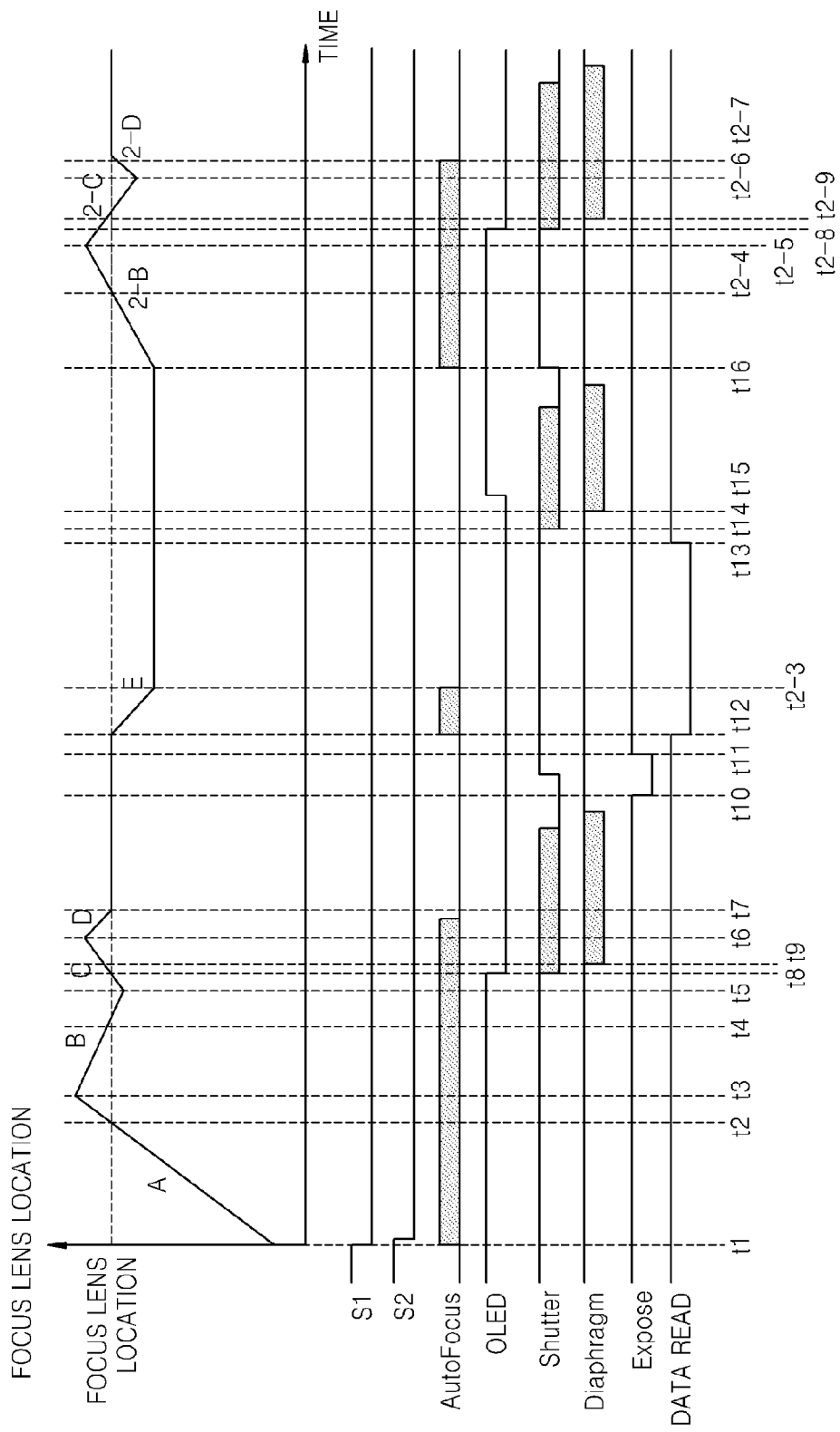
FIG. 18 is a timing diagram for describing an AF method according to another embodiment of the present invention.
Figure 19:
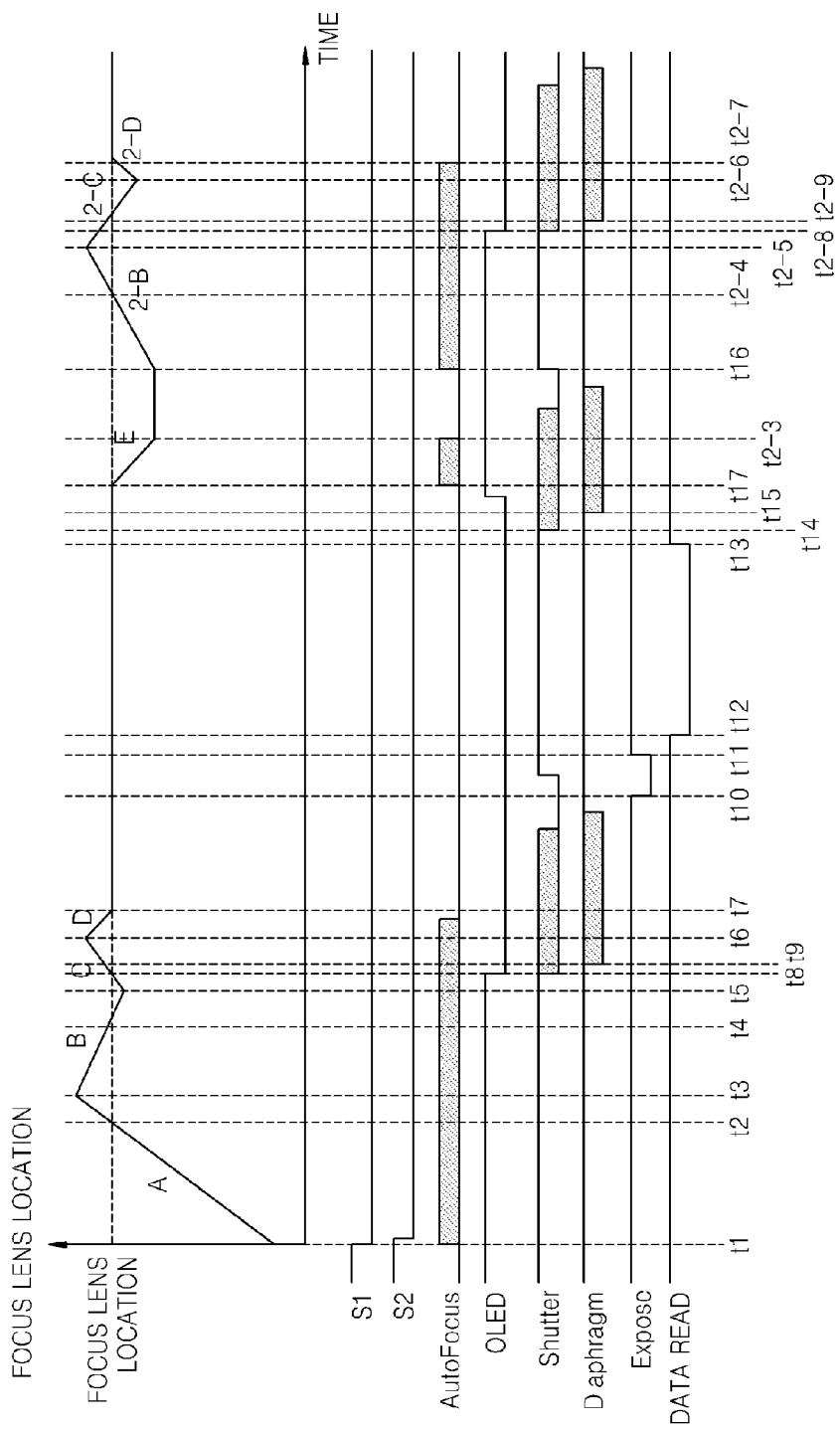
FIG. 19 is a timing diagram for describing an AF method according to another embodiment of the present invention.

FIGS. 17 through 19 are timing diagrams for describing an AF method according to other embodiments of the present invention. Here, FIGS. 17 through 19 show driving timings of the focus lens 104 performed while an image signal is read and the shutter 203 is opened after light exposure.

Referring to FIG. 17, the focus lens 104 is not driven while the image signal is read and the shutter 203 is opened. Operations at times t1 through t16 in FIG. 17 are identical to those in FIG. 5, and thus details thereof will not be repeated.

When the digital photographing apparatus 1 is in a continuous photographing mode, a following photographing operation is performed when the release operation is ended at the time t16. At this time, since the AF operation is performed during a previous release operation, the focus lens 104 is located around the focus location. Accordingly, an operation E is performed by first moving the location of the focus lens 104 from its current location to detect a peak of a contrast value. When the operation E ends at a time t2-3, the focus location is determined at the time t2-3 during a second AF operation. Also, when the shutter 203 is opened due to a second release operation at a time t2-8, the iris 107 starts to be driven at a time t2-9. Accordingly, the AF operation is performed during the release operation, like the first photographing.

FIG. 18 is a timing diagram of starting the AF operation while reading the image signal. A time required to perform the operation E is calculated based on a driving amount and a driving speed of the operation E at the time t12 when the image signal starts to be read after the light exposure, and then the operation E is performed if the operation E can be ended by the time t13 when the reading of the image signal ends.

According to the current embodiment, a time from the time t16 when second photographing starts to a time when second light exposure starts in FIG. 18 may be reduced compared to that of FIG. 17.

FIG. 19 is a timing diagram of starting the AF operation while opening the shutter 203 and driving the iris 107 after first photographing. After opening the shutter 203 for a second time at the time t14, the iris 107 is driven while being opened at the time t15 after 15 ms. The operation E of the AF operation is performed at the time t17 after 15 ms after the iris 107 starts to be driven. Also, an operation 2-B constituting a following AF operation is performed at the time t16 when the first photographing is ended.

According to the current embodiment, a time from the time t16 when second photographing starts to a time when second light exposure starts in FIG. 19 may be reduced compared to that of FIG. 17.

Meanwhile, in FIGS. 18 and 19, the operation E may be ended before the time t16 when the first photographing ends.

Operations of the body unit 200 according to FIGS. 18 and 19 will now be described in detail.

Figure 20A:
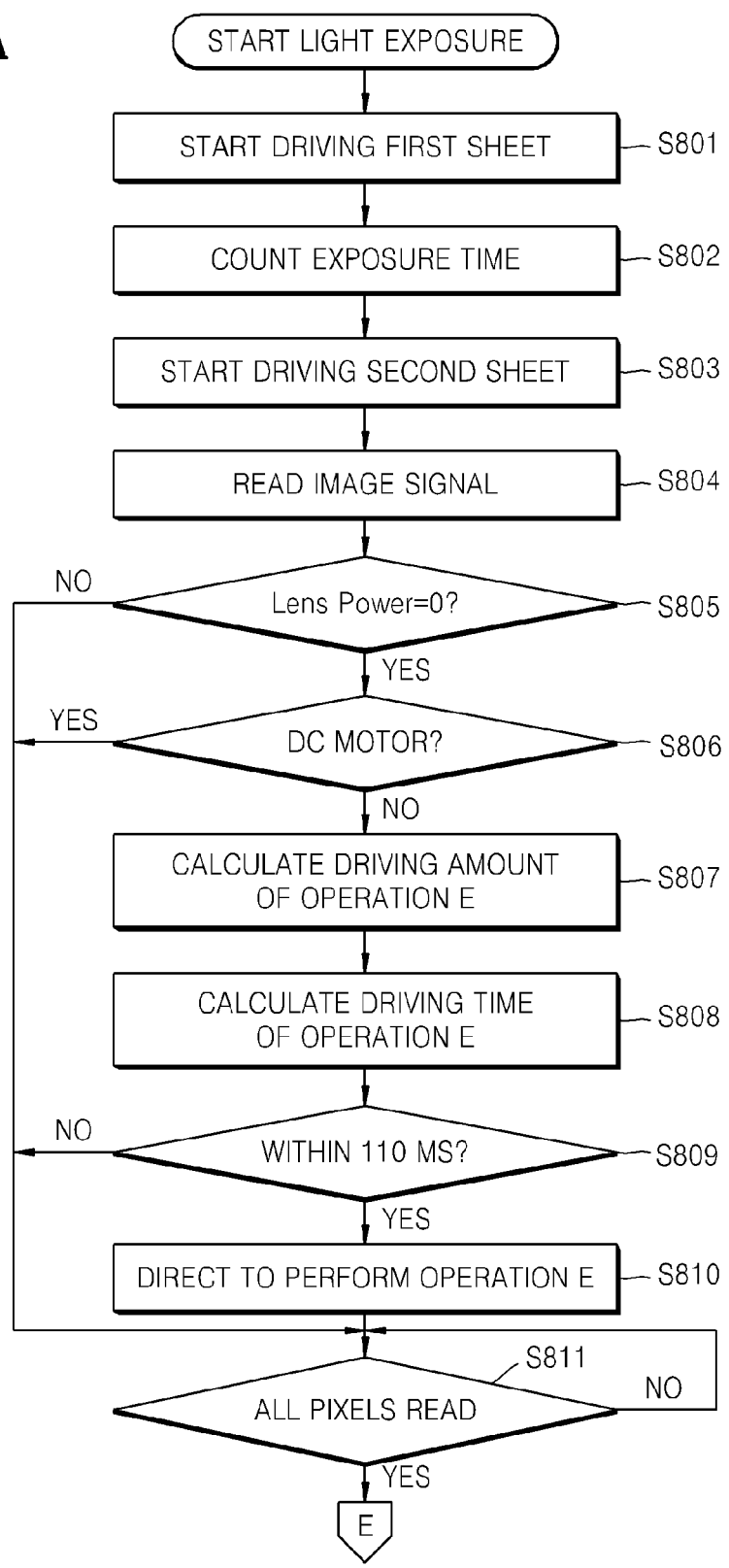
FIGS. 20A and 20B are flowcharts illustrating a method of controlling a body unit of a digital photographing apparatus, according to another embodiment of the present invention.
Figure 20B:
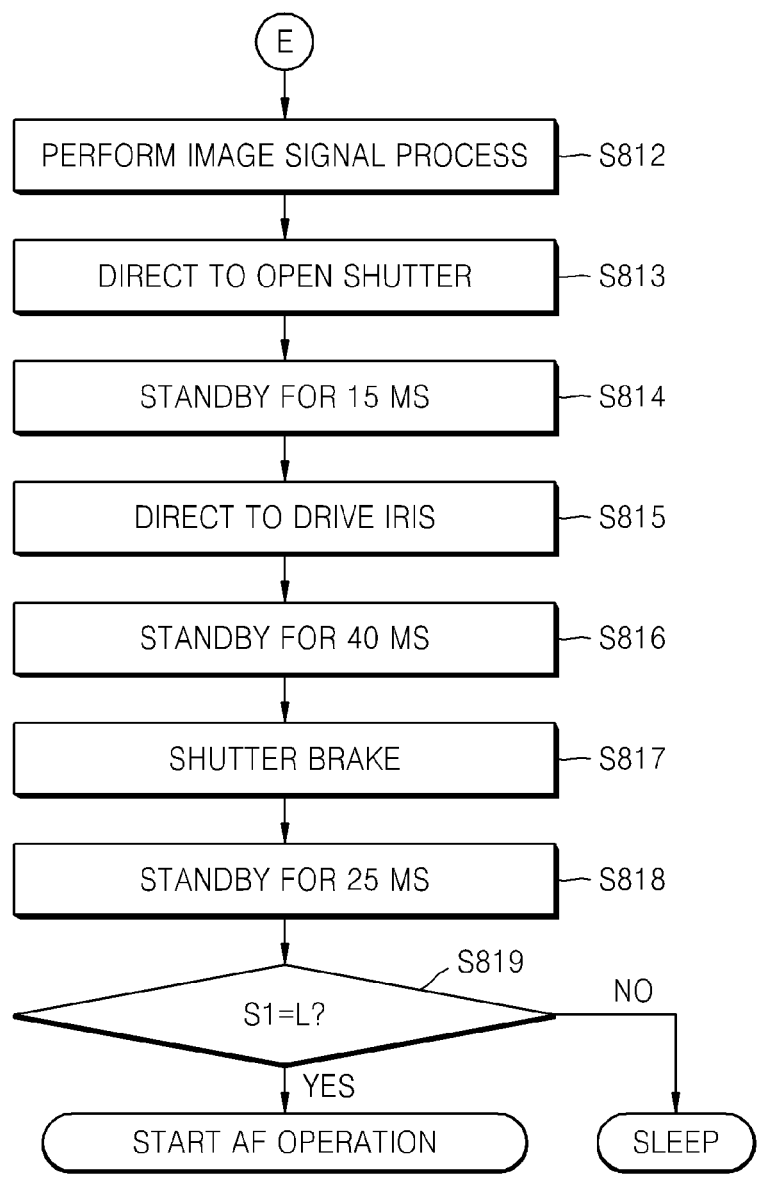

FIGS. 20A and 20B are flowcharts illustrating a method of controlling the body unit 200 of the digital photographing apparatus 1, according to another embodiment of the present invention. In FIGS. 20A and 20B, the body unit 200 performs an operation for a following AF operation while the image pickup device 204 reads an image signal after light exposure, and thus FIGS. 20A and 20B shows processes after the light exposure. In other words, operations of FIGS. 20A and 20B are operations replacing operations after the light exposure of FIG. 10, with respect to the embodiments of FIGS. 7 through 10 and FIGS. 14 through 16. Descriptions about operations similar to those of FIG. 10 will not be repeated herein.

Referring to FIGS. 20A and 20B, a first sheet starts to be driven in operation S801, an exposure time is counted in operation S802, a second sheet starts to be driven in operation S803, and then the image pickup device 204 starts reading an image signal in operation S804. Then, "Lens Power" data is checked in operation S805, and if the "Lens Power" data is 0 and thus power consumption is low, it is determined whether an actuator is a DC motor in operation S806. If the actuator is not a DC motor, the driving amount and the driving time of the operation E are calculated respectively in operations S807 and S808. Since the method of calculating the driving amount and the driving time is described above with respect to the AF operation, details about the method will not be repeated herein.

Next, it is determined whether the calculated driving time is within a time taken to read the image signal, for example, within 110 ms, in operation S809. If the driving time is within 110 ms, the lens 100 is directed to perform the operation E in operation S810.

Meanwhile, if the driving time is not within 110 ms, the AF operation is not performed while reading the image signal from all pixels. Alternatively, when "Lens Power" data is 1 or when the actuator is a DC motor, the operation E is not performed.

When all pixels are read in operation S811, an image signal process is performed in operation S812. Then, the shutter 203 is opened and the iris 107 is driven, and S1 is determined for a following AF operation in operations S813 through S819.

Figure 21A:
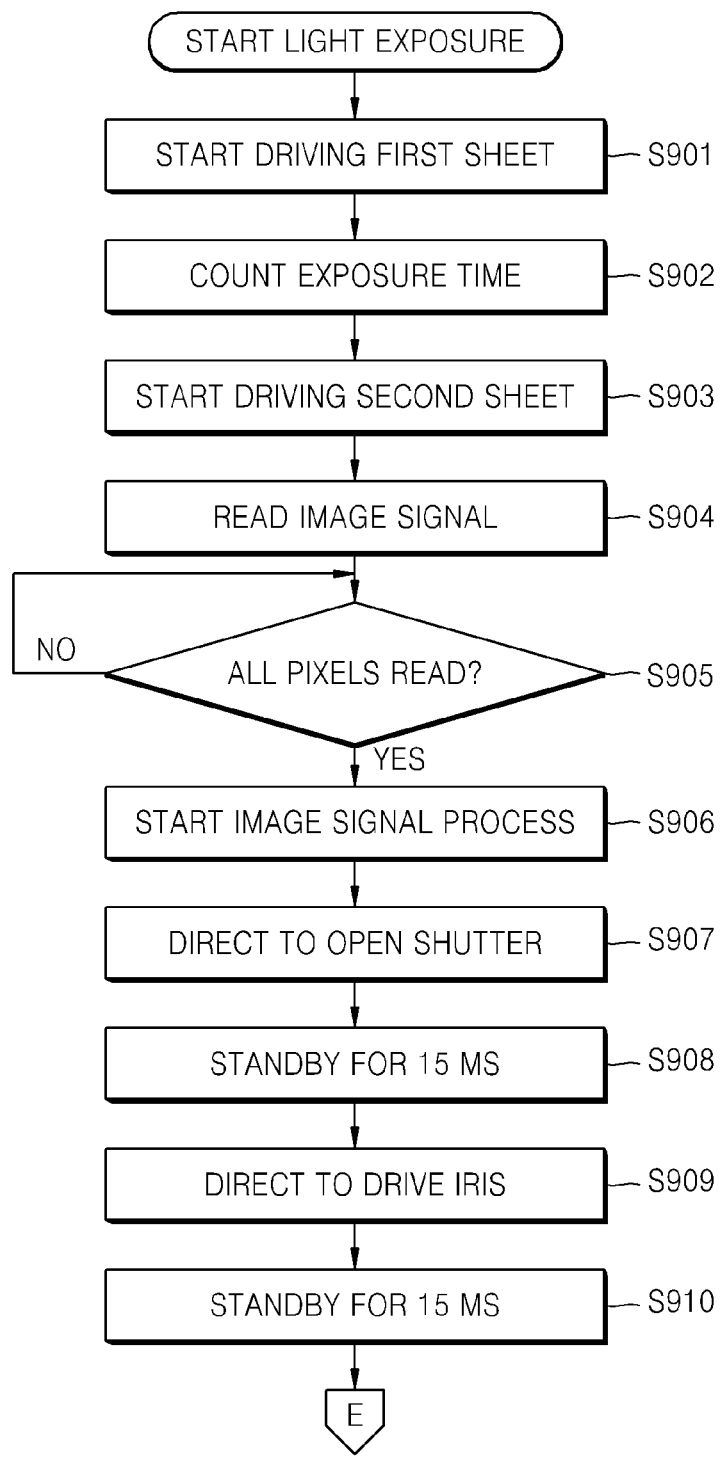
FIGS. 21A and 21B are flowcharts illustrating a method of controlling a body unit of a digital photographing apparatus, according to another embodiment of the present invention.
Figure 21B:
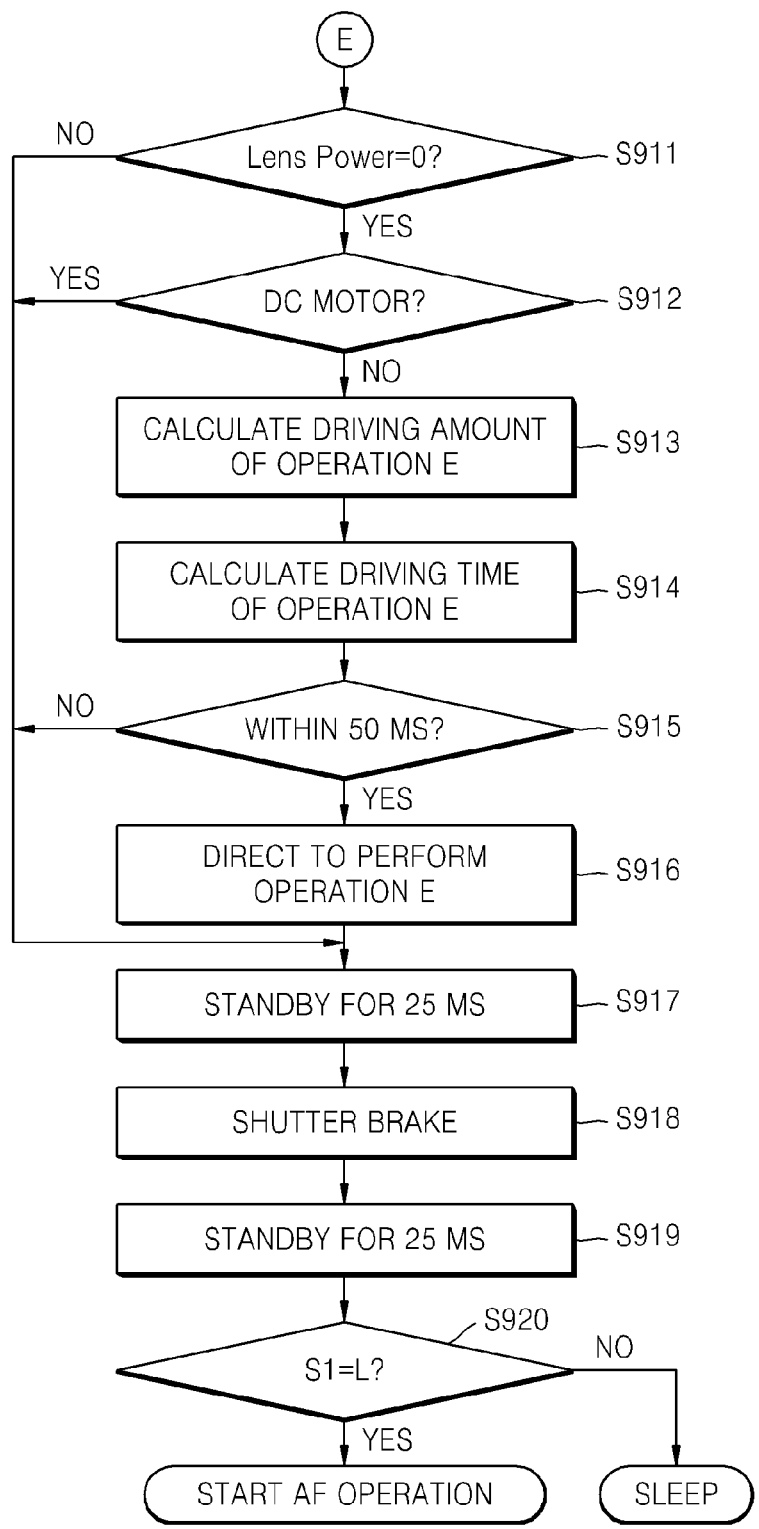

FIGS. 21A and 21B are flowcharts illustrating a method of controlling the body unit 200 of the digital photographing apparatus 1, according to another embodiment of the present invention. In FIGS. 21A and 21B, the body unit 200 performs an operation for a following AF operation while opening the shutter 203, and thus FIGS. 21A and 21B shows processes after the light exposure. In other words, operations of FIGS. 21A and 21B are operations replacing operations after the light exposure of FIG. 10, with respect to the embodiments of FIGS. 7 through 10 and FIGS. 14 through 16. Descriptions about operations similar to those of FIG. 10 will not be repeated herein.

Referring to FIGS. 21A and 21B, a first sheet starts to be driven in operation S901, an exposure time is counted in operation S902, a second sheet starts to be driven in operation S903, and then the image pickup device 204 starts reading an image signal in operation S904. When all pixels are read in operation S905, an image signal process is performed, the shutter 203 is opened, the iris 107 is driven, etc., in operations S906 through S909. The body unit 200 stands by for a predetermined time, for example, about 15 ms, in operation S910, after the iris 107 is driven.

Then, "Lens Power" data is checked in operation S911, and if the "Lens Power" data is 0 and thus power consumption is low, it is determined whether an actuator is a DC motor in operation S912. If the actuator is not a DC motor, the driving amount and the driving time of the operation E are calculated respectively in operations S913 and S914. Since the method of calculating the driving amount and the driving time is described above with respect to the AF operation, details about the method will not be repeated herein.

Then, it is determined whether the driving time is within a predetermined time, for example, within 50 ms, in operation S915. Here, the predetermined time denotes a time when a point of time when the operation E ends according to the driving time is the time t16 when first photographing ends. If the driving time is within 50 ms, the lens 100 is directed to start performing the operation E in operation S916.

Alternatively, when the driving time is not within 50 ms, the operation E is not performed while opening the shutter 203. Alternatively, when the "Lens Power" data is 1 or the actuator is a DC motor, the operation E is not performed.

Lastly, the opening of the shutter 203 and the driving of the iris 107 are performed and then ended, and a level of S1 is determined for a following AF operation in operations S917 through S920.

As described above, according to the digital photographing apparatus 1, the photographing time may be reduced by performing the AF operation for the following photographing while performing the release operation.

While describing the embodiments of the present invention, the values of the driving time and the driving amount are only examples, and may vary.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory that stores program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. An apparatus for adjusting an auto focus, the apparatus comprising:
    an imaging pickup device that generates an image signal by capturing light passing through an imaging lens;
    a shutter that controls light exposure of the image pickup device;
    a focus detector that calculates a focus value from the image signal and detects a focus from the focus value; and
    a release controller that controls a release operation constituting a photographing operation of a still image,
    wherein the release controller comprises, as driving options, a first option that directs a focus lens included in the imaging lens to be driven while driving the shutter, and a second option that directs the focus lens not to be driven while driving the shutter.

2. The apparatus of claim 1, wherein the release controller controls the shutter and the focus lens such that a predetermined time interval is included between a point of time when the shutter starts to be driven and a point of time when the focus lens starts to be driven, in the first option.

3. The apparatus of claim 1, further comprising:
    an exchangeable lens and a body unit,
    wherein the imaging lens is included in the exchangeable lens, and
    wherein the image pickup device, the shutter, the focus detector, and the release controller are included in the body unit.

4. The apparatus of claim 3, wherein the exchangeable lens further comprises:
    a lens storage unit that stores power consumption information; and
    a communicator that transmits the power consumption information to the body unit,
    wherein the release controller selects one of the driving options according to the power consumption information.

5. The apparatus of claim 3, wherein the exchangeable lens further comprises:
    a focus lens driver that drives the focus lens;
    a storage unit that stores driving speed information of the focus lens driver; and
    a communicator that transmits the driving speed information to the body unit,
    wherein the release controller selects one of the driving options according to the driving speed information.

6. The apparatus of claim 3, wherein the exchangeable lens further comprises:
    a focus lens driver that drives the focus lens;
    a storage unit that stores at least one piece of information of focus driving sensitivity information, focus lens driver information, and backlash information of the focus lens; and
    a communicator that transmits the at least one piece of information to the body unit,
    wherein the release controller selects one of the driving options according to the at least one information.

7. The apparatus of claim 3, wherein the body unit further comprises a display unit for displaying a captured image, and stops a display on the display unit when the release controller operates in the first option.

8. The apparatus of claim 1, wherein the release controller selects one of the driving options when the focus lens is stopped.

9. An apparatus for adjusting an auto focus, the apparatus comprising:
    an image pickup device that generates an image signal by capturing light passing through an imaging lens;
    a shutter that controls light exposure of the image pickup device;
    a focus detector that calculates a focus value from the image signal and detecting a focus from the focus value; and
    a release controller that controls a release operation constituting a photographing operation of a still image,
    wherein the release controller directs a focus lens included in the imaging lens to be driven in a section from a point of time when light exposure for capturing the still image ends to a point of time when a reading of image data ends.

10. The apparatus of claim 9, wherein the release controller directs the focus lens to be driven in a direction opposite to a direction of driving the focus lens during the section, after the section is ended.

11. The apparatus of claim 9, wherein the driving of the focus lens in the section is a part of operations for detecting the focus.

12. The apparatus of claim 11, wherein the release controller directs the focus lens to perform remaining operations for detecting the focus by driving the focus lens in the direction opposite to the a direction of driving the focus lens during the section, after the section is ended.

13. The apparatus of claim 9, wherein the release controller controls the shutter and the focus lens such that a predetermined time interval is included between a point of time when the shutter starts to be driven and a point of time when the focus lens starts to be driven, when the focus lens is directed to be driven in the section.

14. The apparatus of claim 9, further comprising:
    an exchangeable lens and a body unit,
    wherein the imaging lens is included in the exchangeable lens, and
    wherein the image pickup device, the shutter, the focus detector, and the release controller are included in the body unit.

15. The apparatus of claim 14, wherein the exchangeable lens further comprises:
    a lens storage unit that stores power consumption information; and a communicator that transmits the power consumption information to the body unit, wherein the release controller determines whether the focus lens is driven in the section according to the power consumption information.

16. The apparatus of claim 14, wherein the exchangeable lens further comprises:

a focus lens driver that drives the focus lens;

a storage unit that stores driving speed information of the focus lens driver; and a communicator that transmits the driving speed information to the body unit, wherein the release controller determines whether the focus lens is driven in the section according to the driving speed information.

17. The apparatus of claim 14, wherein the exchangeable lens further comprises:

a focus lens driver that drives the focus lens;

a storage unit that stores at least one piece of information of focus driving sensitivity information, focus lens driver information, and backlash information of the focus lens; and a communicator that transmits the at least one information to the body unit, wherein the release controller determines whether the focus lens is driven in the section according to the at least one piece of information.

18. The apparatus of claim 14, wherein the body unit further comprises a display unit that displays a captured image, and stops a display on the display unit when the release controller drives the focus lens in the section.

19. The apparatus of claim 14, wherein the body unit further comprises:

a release director that directs a release operation that drives the focus lens and an iris to be performed, and the release controller directs the focus lens to be driven in the section when the release director directs continuous photographing.

20. A method of adjusting an auto focus of an apparatus for capturing a still image according to a shutter signal, the method comprising:

driving a focus lens to adjust a focus; and driving a shutter according to capturing operations of the still image, wherein the focus lens is driven while driving the shutter.

21. The method of claim 20, wherein the driving of the shutter comprises:

driving the shutter before starting light exposure for current photographing; and driving the shutter after the light exposure is ended.

22. The method of claim 21, wherein the focus lens is driven for the current photographing while driving the shutter before starting the light exposure.

23. The method of claim 21, wherein the focus lens is driven for following photographing while driving the shutter after the light exposure is ended.

24. The method of claim 9, wherein the release controller directs a focus lens included in the imaging lens to be driven in a section from a point of time when the shutter starts to be driven for opening the shutter to a point of time when the shutter stops to be driven.

* * * * *